US010038797B2

United States Patent
Oshima

(10) Patent No.: US 10,038,797 B2
(45) Date of Patent: Jul. 31, 2018

(54) STATUS MANAGEMENT SYSTEM, ELECTRONIC APPARATUS, AND METHOD OF COMMUNICATION IN SYSTEM

(71) Applicant: SEIKO EPSON CORPORATION, Tokyo (JP)

(72) Inventor: Yasuhiro Oshima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 14 days.

(21) Appl. No.: 14/858,370

(22) Filed: Sep. 18, 2015

(65) Prior Publication Data
US 2016/0100067 A1 Apr. 7, 2016

(30) Foreign Application Priority Data

Oct. 3, 2014 (JP) .................................. 2014-204934

(51) Int. Cl.
*G06F 15/00* (2006.01)
*H04N 1/00* (2006.01)
*H04L 12/26* (2006.01)
*H04L 29/08* (2006.01)
*H04N 1/44* (2006.01)

(52) U.S. Cl.
CPC ......... *H04N 1/00204* (2013.01); *H04L 43/10* (2013.01); *H04L 67/02* (2013.01); *H04L 67/025* (2013.01); *H04N 1/00244* (2013.01); *H04N 1/00411* (2013.01); *H04N 1/00464* (2013.01); *H04N 1/00477* (2013.01); *H04N 1/4406* (2013.01); *H04N 2201/0094* (2013.01)

(58) Field of Classification Search
CPC ........... H04N 1/00204; H04N 1/00244; H04N 1/00411; H04N 1/00464; H04N 1/00477; H04N 1/4406; H04L 43/10; H04L 67/02; H04L 67/025
USPC ........................................................ 358/1.15
See application file for complete search history.

(56) References Cited

U.S. PATENT DOCUMENTS

2011/0060951 A1* 3/2011 Sako .................. H04N 1/00411
714/57
2012/0028614 A1* 2/2012 Bertin .................. H04W 4/001
455/412.2

(Continued)

FOREIGN PATENT DOCUMENTS

JP 2008-017134 A 1/2008
JP 2014-048746 A 3/2014

*Primary Examiner* — Mark R Milia

(57) ABSTRACT

A multifunction machine of a status management system includes an apparatus-side status change communication unit that transmits a status change notification to a management server when status information that is managed by the multifunction machine is changed by operating the multifunction machine, and an apparatus-side information communication unit that transmits a response to the request notification to the management server when a request notification is received from the management server. The management server of the status management system includes a server-side status change communication unit that receives a status change notification from the multifunction machine, and a server-side information communication unit that transmits a request notification to the multifunction machine and receives a response to the request notification from the multifunction machine when the server-side status change communication unit receives the status change notification.

11 Claims, 11 Drawing Sheets

(56) References Cited

U.S. PATENT DOCUMENTS

| | | | |
|---|---|---|---|
| 2013/0010317 A1* | 1/2013 | Sai | G06F 3/1221 358/1.13 |
| 2013/0050728 A1* | 2/2013 | Ito | G06K 15/005 358/1.13 |
| 2013/0163016 A1* | 6/2013 | Maekawa | G06K 15/402 358/1.13 |
| 2013/0166717 A1* | 6/2013 | Kojima | G06F 3/1207 709/223 |

* cited by examiner

FIG. 5

| GROUP NAME | USER NAME | ACCOUNT | BALANCE |
|---|---|---|---|
| FIRST GROUP G(1) | ○○○○ | 11TH ACCOUNT X (11) | FIRST BALANCE A(1) |
| | ○X○X | 12TH ACCOUNT X (12) | |
| | ⋮ | ⋮ | |
| SECOND GROUP G(2) | △△△△ | 21ST ACCOUNT X (21) | SECOND BALANCE A(2) |
| | △X△X | 22ND ACCOUNT X (22) | |
| | ⋮ | ⋮ | |

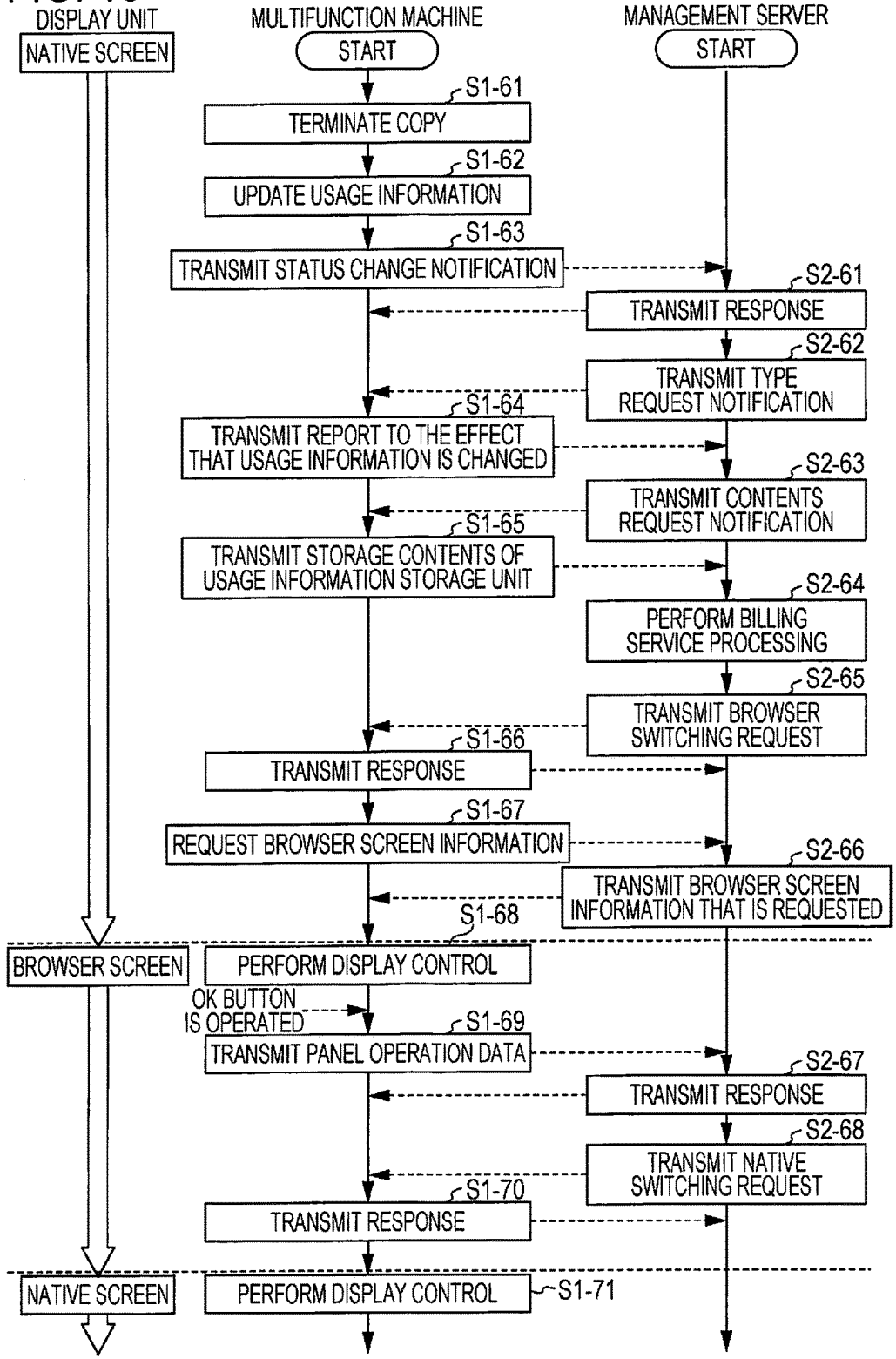

STATUS MANAGEMENT SYSTEM, ELECTRONIC APPARATUS, AND METHOD OF COMMUNICATION IN SYSTEM

BACKGROUND

1. Technical Field

The invention relates to a status management system that includes an electronic apparatus and an external server, an electronic apparatus that makes up the status management system, and a method of communication in the system, which is applied in the status management system.

2. Related Art

A multifunction apparatus (one example of an electronic apparatus) that has a Web browser function is disclosed in JP-A-2014-48746. In the multifunction machine, a browser screen that is a screen that is created by an external server can be displayed on a display unit of the multifunction machine itself. That is, when a uniform resource locator (URL) is designated by an external server, a control device of the multifunction machine requests browser screen data that is data relating to a browser screen of the URL, and receives (downloads) the browser screen data. Then, the control device displays the browser screen that is based on the received browser screen data, on the display unit.

Here, a system that includes the multifunction machine described above and an external server that communicates with the multifunction machine through a network causes the multifunction machine to function as an HTTP client, and the external server to function as an HTTP server. In this case, when the external server transmits a request notification, the multifunction machine that receives the request notification transmits information that is requested by the external server, as a response to the request notification. Moreover, HTTP is short for hypertext transfer protocol.

Incidentally, as examples of the external server that is applied to the system, there can be a server that performs polling, and a server that does not perform the polling. In a system that employs the server which performs the polling, although status information that is managed by the multifunction machine is changed, the server can know a type of and contents of status information that is changed, by performing the polling. However, in a system that employs the server that does not perform the polling, because the server cannot know that the status information which is managed by the multifunction machine is changed, the server, of course, cannot know the type of and the contents of the changed status information.

SUMMARY

An advantage of some aspects of the invention is to provide a status management system, an electronic apparatus, and a method of communication in the system, in which communication can be performed between an electronic apparatus and an external server, without depending on specifications of the external server.

According to an aspect of the invention, there is provided a status management system including: an electronic apparatus; and an external server that communicates with the electronic apparatus through a network, in which the electronic apparatus includes an apparatus-side status change communication unit that transmits a status change notification to the external server when status information that is managed by the electronic apparatus is changed by operating the electronic apparatus, and an apparatus-side information communication unit that transmits a response to a request notification to the external server when receiving the request notification from the external server, and in which the external server includes a server-side status change communication unit that receives the status change notification from the electronic apparatus, and a server-side information communication unit that transmits the request notification to the electronic apparatus when the server-side status change communication unit receives the status change notification, and receives the response to the request notification from the electronic apparatus.

With the configuration described above, in a case where the apparatus-side status change communication unit of the electronic apparatus and the server-side status change communication unit of the external server communicate with each other, the electronic apparatus functions as an HTTP server, and the external server functions as an HTTP client. Furthermore, in a case where the apparatus-side information communication unit of the electronic apparatus and the server-side information communication unit of the external server communicate with each other, the electronic apparatus functions as the HTTP client, and the external server functions as the HTTP server.

Therefore, with the configuration described above, when the status information that is managed by the electronic apparatus is changed, by the operation of the electronic apparatus by the user, the status change notification is transmitted from the electronic apparatus to the external server. The external server receives the status change information, and thus the external server can know that the status information that is managed by the electronic apparatus is changed. When this is done, the external server that receives the status change notification transmits the request notification to the electronic apparatus and receives the response to the request notification from the electronic apparatus. Thus, the external server can acquire the data relating to the status information that is changed. When the status information that is managed by the electronic apparatus is changed, the electronic apparatus leaves the external server informed that the status information is changed. Thus, communication can be performed between the electronic apparatus and the external server without depending on specifications of the external server that is employed in the system.

In the status management system, the server-side information communication unit of the external server may transmit to the electronic apparatus a type request notification that is the request notification that a type of status information that is changed is requested, among pieces of status information that are managed by the electronic apparatus, when the server-side status change communication unit receives the status change notification from the electronic apparatus; the server-side information communication unit of the external server may transmit to the electronic apparatus a contents request notification that is the request notification that contents of the status information that is changed are requested, and may receive a response to the contents request notification from the electronic apparatus, when the server-side status change communication unit receives data relating to the type of status information that is changed, as a response to the type request notification, from the electronic apparatus; the apparatus-side information communication unit of the electronic apparatus may transmit to the external server the data relating to the type of status information that is changed, as a response to the type request notification, when receiving the type request notification from the external server; and when receiving the contents request notification from the external server, the apparatus-side information communication unit of the electronic apparatus may transmit data relating to the contents of the status information that is changed, as a response to the contents request notification, to the external server.

With the configuration described above, when the status information that is managed by the electronic apparatus is changed by the operation of the electronic apparatus by the user and the status change notification is transmitted from the electronic apparatus to the external server, the type request notification that the type of status information that is changed is requested is transmitted from the external server to the electronic apparatus. Then, the response to the type request notification is transmitted from the electronic apparatus to the external server, and thus the external server can know what type of status information is changed. Subsequently, the contents request notification that the contents of the status information that is changed are requested is transmitted from the external server that receives the response to the type request notification to the electronic apparatus. Then, the electronic apparatus transmits the response to the contents request notification and the external server receives the response from the electronic apparatus. Thus, the external server can know what information (a value or the like) the status information is changed to.

In the status management system, in a case where, among operations that a user causes the electronic apparatus to perform, an operation that changes pieces of status information which are managed by the electronic apparatus is set to be a first user operation and an operation that does not change the pieces of status information that are managed by the electronic apparatus is set to be a second user operation, the apparatus-side status change communication unit of the electronic apparatus may transmit the status change notification to the external server when the first user operation is performed, and, on the other hand, may not transmit the status change notification to the external server when the second user operation is performed; and when the first user operation is performed, if the server-side status change communication unit receives the status change notification from the electronic apparatus, the server-side information communication unit of the external server may transmit the request notification to the electronic apparatus and receive a response to the request notification, from the electronic apparatus.

With the configuration described above, when the second user operation is operated, because the status information that is managed by the electronic apparatus is not changed, the status change notification is not transmitted from the electronic apparatus. When the first user operation is operated, because the status information that is managed by the electronic apparatus is changed, the status change notification is transmitted from the electronic apparatus to the external server. Therefore, in the case where the first user operation is performed, the external server can acquire the data relating to the status information that is changed.

In the status management system, the electronic apparatus may include a display unit on which a screen is displayed, a first display control unit that displays on the display unit a native screen that is a screen which is based on screen data that is prepared in the electronic apparatus, and a second display control unit that displays on the display unit a browser screen that is a screen which is based on screen data that is received from the external server; the external server may include a switching request unit that requests the electronic apparatus to switch a screen that is displayed on the display unit of the electronic apparatus from one screen of the native screen and the browser screen to the other screen; the switching request unit may request the electronic apparatus to switch the screen that is displayed on the display unit from the native screen to the browser screen, when, under a situation where the native screen is displayed on the display unit of the electronic apparatus, the server-side information communication unit receives a response to the request notification that is transmitted by the server-side information communication unit and the browser screen is displayed on the display unit; and the switching request unit may request the electronic apparatus to switch the screen that is displayed on the display unit from the browser screen to the native screen, when, under a situation where the browser screen is displayed on the display unit, the server-side information communication unit receives a response to the request notification that is transmitted by the server-side information communication unit and the native screen is displayed on the display unit.

With the configuration described above, when the first user operation is performed and there occurs a need to switch the screen that is displayed on the display unit from one screen of the native screen and the browser screen to the other, as a result of performing the first user operation, the status change notification is transmitted from the electronic apparatus to the external server. When this is done, the request notification is transmitted from the external server, and the response to the request notification is transmitted from the electronic apparatus. Then, based on the response, when it is determined that switching of the screen that is displayed on the display unit is switched from one screen of the native screen and the browser screen to the other is necessary, the external server requests the electronic apparatus to switch the screen that is displayed on the display unit from the one screen of the native screen and the browser screen to the other. When the electronic apparatus receives the request, the other screen is displayed on the display unit. Then, at this time, the external server can know whether the screen that is displayed on the display unit is the browser screen or the native screen.

In the status management system, when requesting the electronic apparatus to switch the screen that is displayed on the display unit of the electronic apparatus from the browser screen to the native screen, the switching request unit of the external server may also transmit data relating to a condition parameter for specifying the native screen that is displayed on the display unit to the electronic apparatus; and when the external server requests the first display control unit of the electronic apparatus to switch the screen that is displayed on the display unit from the browser screen to the native screen, the first display control unit of the electronic apparatus may display the native screen in accordance with the condition parameter that is based on data that is received along with the request, on the display unit.

With the configuration described above, when the external server requests the electronic apparatus to switch the screen that is displayed on the display unit from the browser screen to the native screen, the data relating to the condition parameter for specifying the native screen that is displayed on the display unit is transmitted to the electronic apparatus. For this reason, in the electronic apparatus, the native screen in accordance with the condition parameter from the external server, that is, the native screen that is designated by the external server can be displayed on the display unit.

In the status management system, the electronic apparatus may include a reading unit that reads an account which is stored on an authentication card for logging in to the electronic apparatus, and an account storage unit in which the account that is read by the reading unit is stored; the external server may include an account authentication processing unit that performs processing which authenticates the account that is read by the reading unit of the electronic apparatus from the authentication card, and permits logging in to the electronic apparatus; the first user operation may include an operation that causes the authentication card to be read by the reading unit; the apparatus-side status change communication unit of the electronic apparatus may transmit the status change notification to the external server when the account that is read by the reading unit is stored in the account storage unit; when receiving the request notification from the external server after the status change notification is transmitted from the apparatus-side status change communication unit, the apparatus-side information communication unit of the electronic apparatus may transmit a response to the request notification to the external server; when the server-side information communication unit receives data relating to the account, as a response to the request notification, the account authentication processing unit of the external server may perform processing that authenticates the account and may permit logging in to the electronic apparatus; when the account authentication processing unit permits logging in to the electronic apparatus under a situation where the native screen is displayed on the display unit of the electronic apparatus, the switching request unit of the external server may request the electronic apparatus to switch the screen that is displayed on the display unit from the native screen to the browser screen; and when, under a situation where the native screen is displayed on the display unit, the reading unit reads the account from the authentication card and the external server makes a request to switch the screen that is displayed on the display unit from the native screen to the browser screen, the second display control unit of the electronic apparatus may receive from the external server screen data relating to the browser screen that is displayed on the display unit and may display the browser screen that is based on the screen data on the display unit, when logging in to the electronic apparatus is permitted.

With the configuration described above, when the account that is stored on the authentication card is read by the reading unit, the account is stored in the account storage unit of the electronic apparatus. Accordingly, the contents that are stored in the account storage unit are changed. When the status information that is managed by the electronic apparatus is changed, the status change notification is transmitted from the electronic apparatus to the external server. When this is done, the external server transmits the request notification, and receives the response to the request notification from the electronic apparatus. Communication is performed in this manner between the external server and the electronic apparatus, and thus the external server can acquire the account that is read by the reading unit. Then, when the external server acquires the account, in the external server, processing that authenticates the acquired account is performed and logging in to the electronic apparatus is performed.

Here, in a case where under the situation where the native screen is displayed on the display unit, the reading unit of the electronic apparatus reads the account, the request to switch the screen that is displayed on the display unit from the native screen to the browser screen is transmitted from the external server to the electronic apparatus. When this is done, in the electronic apparatus, the screen data relating to the browser screen is received from the external server, and thus the browser screen that is based on the screen data can be displayed on the display unit.

In the status management system, the first user operation may include a logging-out operation that is an operation for logging out of the electronic apparatus; the external server may include a logging-out permission unit that performs logging out of the electronic apparatus when the logging-out operation is performed; the apparatus-side status change communication unit of the electronic apparatus may transmit the status change notification to the external server when the logging-out operation is performed; the apparatus-side information communication unit of the electronic apparatus may transmit a response to the request notification to the external server when receiving the request notification from the external server by the apparatus-side status change communication unit transmitting the status change notification because of the logging-out operation that is performed; and the logging-out permission unit of the external server may permit logging out of the electronic apparatus when the server-side information communication unit receives from the electronic apparatus a report to the effect that the logging-out operation is performed as the response to the request notification.

With the configuration described above, when the user performs the logging-out operation, the status change notification is transmitted from the electronic apparatus. When this is done, the external server transmits the request notification, and receives the response to the request notification from the electronic apparatus. The communication is performed in this manner between the external server and the electronic apparatus, and thus the external server can confirm that the logging-out operation is performed by the user. When this is done, in the external server, the processing that permits logging out of the electronic apparatus is performed.

In the status management system, the electronic apparatus may be an apparatus that is capable of performing reception-required processing which is processing that is based on data which is received from the external server, and reception-non-required processing which is processing that does not require that data is received from the external server; when urging a user to select any processing of the reception-required processing and the reception-non-required processing, the second display control unit of the electronic apparatus may receive screen data relating to the browser screen for processing selection from the external server, and may display the browser screen for the processing selection that is based on the screen data on the display unit; when, under a situation where the browser screen for the processing selection is displayed on the display unit of the electronic apparatus, the reception-non-required processing is selected, the switching request unit of the external server may transmit to the electronic apparatus a switching request that is a request for switching the screen that is displayed on the display unit from the browser screen to the native screen; and when receiving the switching request from the external server, the first display control unit of the electronic apparatus may display on the display unit the native screen for condition selection for selecting a condition for performing the reception-non-required processing that is selected.

With the configuration described above, when, under the situation where the browser screen for the processing selection is displayed, the reception-non-required processing is selected by the operation by the user and the report to the effect that the reception-non-required processing is selected is confirmed in the external server, the external server requests the electronic apparatus to switch the screen that is displayed on the display unit from the browser screen to the native screen. Accordingly, in the electronic apparatus, the screen that is displayed on the display unit can be switched from the browser screen for the processing selection to the native screen for the condition selection.

In the status management system, the electronic apparatus may include a usage information storage unit in which usage information that is information relating to processing is stored when the electronic apparatus performs the processing; the external server may include a usage information processing unit that performs processing in accordance with the usage information that is stored in the usage information storage unit of the electronic apparatus; the apparatus-side status change communication unit of the electronic apparatus may transmit the status change notification to the external server when the usage information is stored in the usage information storage unit; and the usage information processing unit of the external server may perform processing in accordance with the usage information, when the server-side information communication unit receives data relating to the usage information that is stored in the usage information storage unit, as a response to the request notification.

With the configuration described above, when the processing (the reception-required processing or the reception-non-required processing) that is selected by the user is performed in the electronic apparatus, the usage information that is based on the result of performing the processing is stored in the usage information storage unit. Then, when the storage contents of the usage information storage unit are updated in this manner, the status change notification is transmitted from the electronic apparatus to the external server. After the external server receives the status change notification in this manner, the electronic apparatus responds to the request notification from the external server, and thus the external server can acquire the usage information that is stored in the usage information storage unit. As a result, the external server can be caused to perform the processing in accordance with the usage information that is stored in the usage information storage unit.

In the status management system, the electronic apparatus may include a touch panel; the second user operation may include an operation of the touch panel; panel operation data that is data relating to the operation of the touch panel may be transmitted to the external server; the apparatus-side status change communication unit of the electronic apparatus may not transmit the status change notification to the external server, when the reception-non-required processing is selected by the operation of the touch panel, under a situation where the browser screen for the processing selection is displayed on the display unit; and the switching request unit of the external server may transmit to the electronic apparatus the switching request that is the request for switching the screen that is displayed on the display unit from the browser screen to the native screen, when receiving the panel operation data to the effect that the reception-non-required processing is selected, in the situation where the browser screen for the processing selection is displayed on the display unit of the electronic apparatus.

With the configuration described above, when, under the situation where the browser screen for the processing selection is displayed on the display unit, the reception-non-required processing is selected by the operation of the touch panel by the user, the panel operation data is transmitted from the electronic apparatus. At this time, because the status information that is managed by the electronic apparatus is not changed, the status change notification is not transmitted from the electronic apparatus. Then, the external server receives the panel operation data in this manner, and thus the external server can know that the reception-non-required processing is selected by the user and requests the electronic apparatus to switch the screen that is displayed on the display unit from the browser screen to the native screen. Accordingly, in the electronic apparatus, the screen that is displayed on the display unit can be switched from the browser screen for the processing selection to the native screen for the condition selection.

In the status management system, the electronic apparatus may have push-down type hardware keys; the first user operation may include an operation of the hardware key; processing operations may be selectable by the operation of the hardware key when the browser screen for the processing selection is displayed on the display unit of the electronic apparatus; the apparatus-side status change communication unit of the electronic apparatus may transmit the status change notification to the external server when the reception-non-required processing is selected by the operation of the hardware key under a situation where the browser screen for the processing selection is displayed on the display unit of the electronic apparatus; under the situation where the browser screen for the processing selection is displayed on the display unit of the electronic apparatus, the apparatus-side status change communication unit may transmit the status change notification because the reception-non-required processing is selected by the operation of the hardware key, and when receiving the request notification from the external server, the apparatus-side information communication unit of the electronic apparatus may transmit a report to the effect that the reception-non-required processing is selected, as a response to the request notification, to the external server; and when the server-side information communication unit receives the report to the effect that the reception-non-required processing is selected, as the response to the request notification under the situation where the browser screen for the processing selection is displayed on the display unit of the electronic apparatus, the switching request unit of the external server may transmit to the electronic apparatus the switching request that is the request for switching the screen that is displayed on the display unit from the browser screen to the native screen.

With the configuration described above, when, under the situation where the browser screen for the processing selection is displayed on the display unit, the reception-non-required processing is selected by the operation of the hardware key by the user, the status change notification is transmitted from the electronic apparatus. When this is done, the external server transmits the request notification, and receives the response to the request notification from the electronic apparatus. The communication is performed in this manner between the external server and the electronic apparatus, and thus the external server can know that the reception-non-required processing is selected by the user and requests the electronic apparatus to switch the screen that is displayed on the display unit from the browser screen to the native screen. Accordingly, in the electronic apparatus, the screen that is displayed on the display unit can be switched from the browser screen for the processing selection to the native screen for the condition selection.

According to another aspect of the invention, there is provided an electronic apparatus that communicates with an external server through a network, including: an apparatus-side status change communication unit that transmits a status change notification to the external server when status information that is managed by the electronic apparatus is changed by operating the electronic apparatus; and an apparatus-side information communication unit that, when receiving a request notification from the external server which receives the status change notification, transmits a response to the request notification, to the external server.

With the configuration described above, when the status information that is managed by the electronic apparatus is changed by the operation of the electronic apparatus by the user, the electronic apparatus functions as the HTTP server, and the external server functions as the HTTP client. Furthermore, after the status change notification is transmitted from the electronic apparatus to the external server, the electronic apparatus functions as the HTTP client, and the external server functions as the HTTP server. Therefore, the electronic apparatus is employed as the electronic apparatus that makes up the status management system, and thus the same operational effect as that of the status management system described above can be obtained.

According to a still another aspect of the invention, there is provided a method of communication in a system, which is applied to a status management system including an electronic apparatus and an external server that communicates with the electronic apparatus through a network, including: causing a control device of the electronic apparatus to transmit a status change notification to the external server when status information that is managed by the electronic apparatus is changed by operating the electronic apparatus; causing the external server to transmit a request notification to the electronic apparatus when the status change notification is received from the electronic apparatus; and causing the control device of the electronic apparatus to transmit to the external server a response to the request notification when the request notification is received from the external server.

With the configuration described above, the same operational effect as that of the status management system can be obtained.

BRIEF DESCRIPTION OF THE DRAWINGS

The invention will be described with reference to the accompanying drawings, wherein like numbers reference like elements.

FIG. 5 is a table for managing a balance for every group.

FIG. 15 is a flowchart for describing a procedure for processing that is performed when the user is provided with the guidance on the balance after the performing of the copying is terminated.

DESCRIPTION OF EXEMPLARY EMBODIMENTS

A status management system, an electronic apparatus, and a method of communication in the system, which are realized according to one embodiment will be described below referring to FIGS. 1 to 15.

Figure 1:
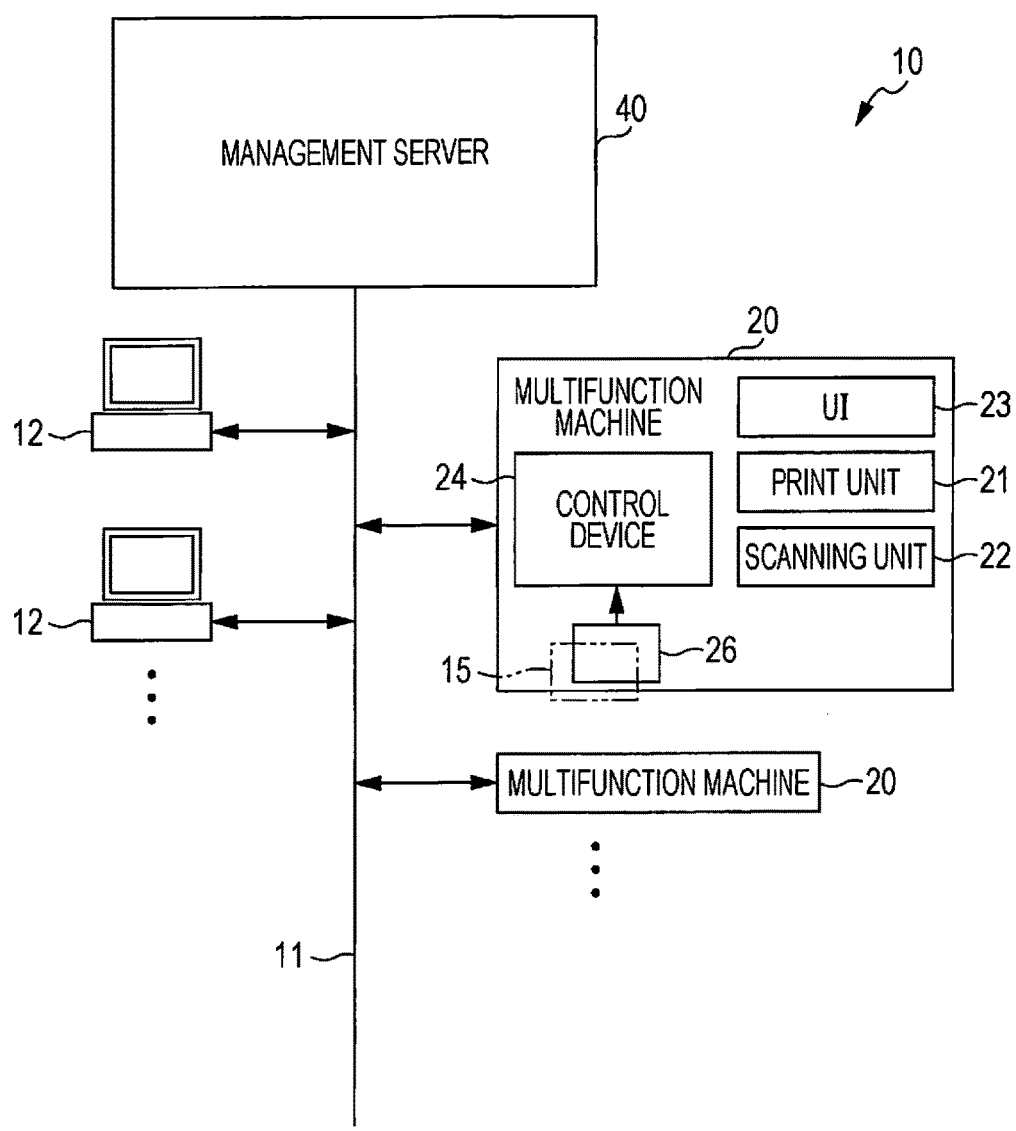
FIG. 1 is a configuration diagram illustrating an outline of a status management system according to one embodiment.

As illustrated in FIG. 1, a status management system 10 according to the present embodiment includes a management server 40 that is one example of an external server and multiple multifunction machines 20 that are capable of performing communication with the management server 40 through a network 11 such as a local area network (LAN). The multifunction machine 20 is one example of an "electronic apparatus."

The multifunction machine 20 includes an ink jet type print unit 21 that performs printing on a medium such as a sheet of paper, a scanning unit 22 that reads an image that is stored on the medium, a user interface 23, and a control device 24 that controls the multifunction machine 20 along with the management server 40. Print schemes that are used by the print unit 21 may be any schemes, other than an ink jet type scheme, such as a dot impact scheme, and a laser scheme, and a heat-sensitive scheme, with which printing on the medium is possible.

Furthermore, the multifunction machine 20 includes a reading unit 26 that reads an account and the like that are stored in an authentication card 15 that a user owns. In a case where an account that is read by the reading unit 26 is among accounts that are managed in the management server 40, the user can log in to the multifunction machine 20, and thus it is possible for the user to cause the multifunction machine 20 to perform various processing operations such as printing and copying.

The processing operations that are performable in the multifunction machine 20 include printing, copying, scanning and facsimile (which is hereinafter referred to as FAX."). For example, when the user operates an information terminal 12 to make a request for printing, a print job is transmitted from the information terminal 12 to the management server 40. Then, when the print job is transmitted from the management server 40 to any one of the multifunction machines 20, the multifunction machine 20 to which the print job is transmitted performs printing based on the print job.

Moreover, the printing is processing that is based on the print job that is received from the management server 40, and is one example of "reception-required processing" that is based on data that is received from the management server 40. On the other hand, processing other than the printing, that is, the copying, the scanning, or the FAX is one example of the "reception-non-required processing" that does not require the reception of the data from the management server 40.

Then, when the processing such as the printing or the copying is performed in the multifunction machine 20, usage data that is data relating to usage information which is information relating to the processing is transmitted from the multifunction machine 20 to the management server 40. The usage information includes the number of media on which the printing or the copying is performed, information relating to the user who makes a request to perform the processing, and the like. The usage information is managed in the management server 40. Then, in the status management system 10, billing service is performed for every user or every group that is made up of multiple users, by using the usage information that is managed by the management server 40.

Figure 2:
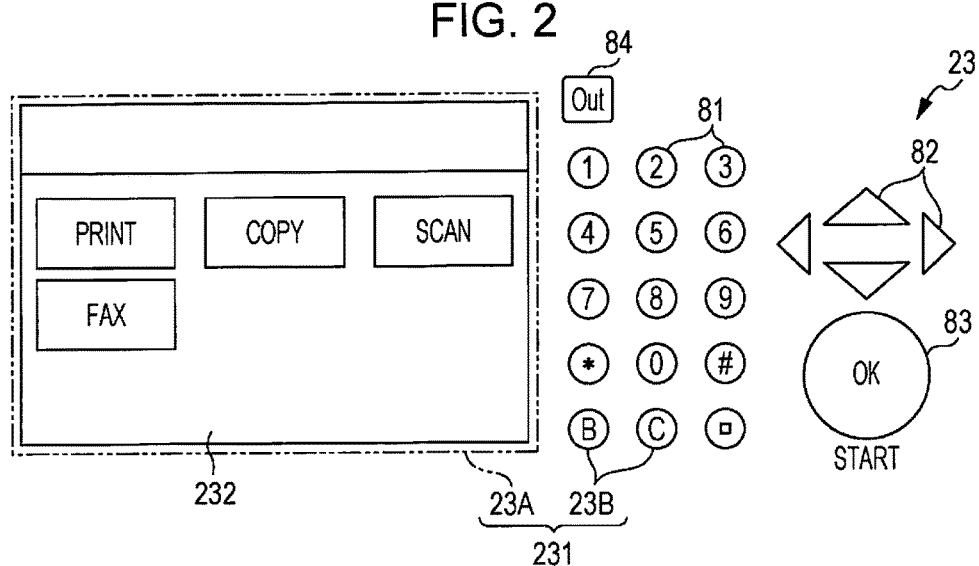
FIG. 2 is a schematic diagram illustrating one example of a user interface of a multifunction machine.

Next, the user interface 23 of the multifunction machine 20 is described referring to FIG. 2.

As illustrated in FIG. 2, the user interface 23 includes an operation unit 231 that receives an input operation by the user, and a display unit 232. The operation unit 231 has a touch panel 23A that is attached to the display unit 232, and multiple push-down type hardware keys 23B. Moreover, in FIG. 2, the touch panel 23A is indicated by a two-dot chain line. Then, when a "print" area on the display unit 232, for example, is selected by the user who operates the touch panel 23A, the status management system 10 according to the present embodiment can recognize that the user requests the printing.

The hardware keys 23B include numeric keys 81, directional keys 82, a determination key 83, a logging-out key 84, and the like. The numeric keys 81, for example, are operated when a number is input, such as when the number of copies and the like are determined. The directional keys 82 are operated such as when processing that is performed without operating the touch panel 23A is selected. The determination key 83 is operated when the processing that is performed without operating the touch panel 23A is selected and when the selected processing is performed. The logging-out key 84 is operated when the user logs out of the multifunction machine 20. Moreover, the operation that the user performs on the logging-out key 84 when logging out of the multifunction machine 20 is also referred to as a "logging-out operation."

Here, one example of a case where the processing that the multifunction machine 20 is caused to perform is selected by operating the hardware keys 23B is described. For example, in a case where the print is selected, the user operates the directional keys 82 to move a cursor up to the "print area" on the display unit 232. Then, when the user operates the determination key 83 in this state, the "print" is selected and the status management system 10 according to the present embodiment can recognize that the user makes a request to perform the printing.

Moreover, input data that results from the user operating the operation unit 231 is input into the control device 24 of the multifunction machine 20. That is, when the hardware keys 23B are operated, key operation data that is data relating to the operation of the hardware keys 23B is input, as the input data, into the control device 24, and the key operation data is interpreted by the control device 24. On the other hand, when the touch panel 23A is operated, panel operation data that is data relating to the operation of the touch panel 23A is input, as the input data, into the control device 24. The panel operation data may be transmitted from the control device 24 to the management server 40. Then, when the panel operation data is accordingly transmitted to the management server 40, the panel operation data is interpreted in the management server 40. On the other hand, when the panel operation data is not transmitted to the management server 40, the panel operation data is interpreted in the control device 24.

Figure 3:
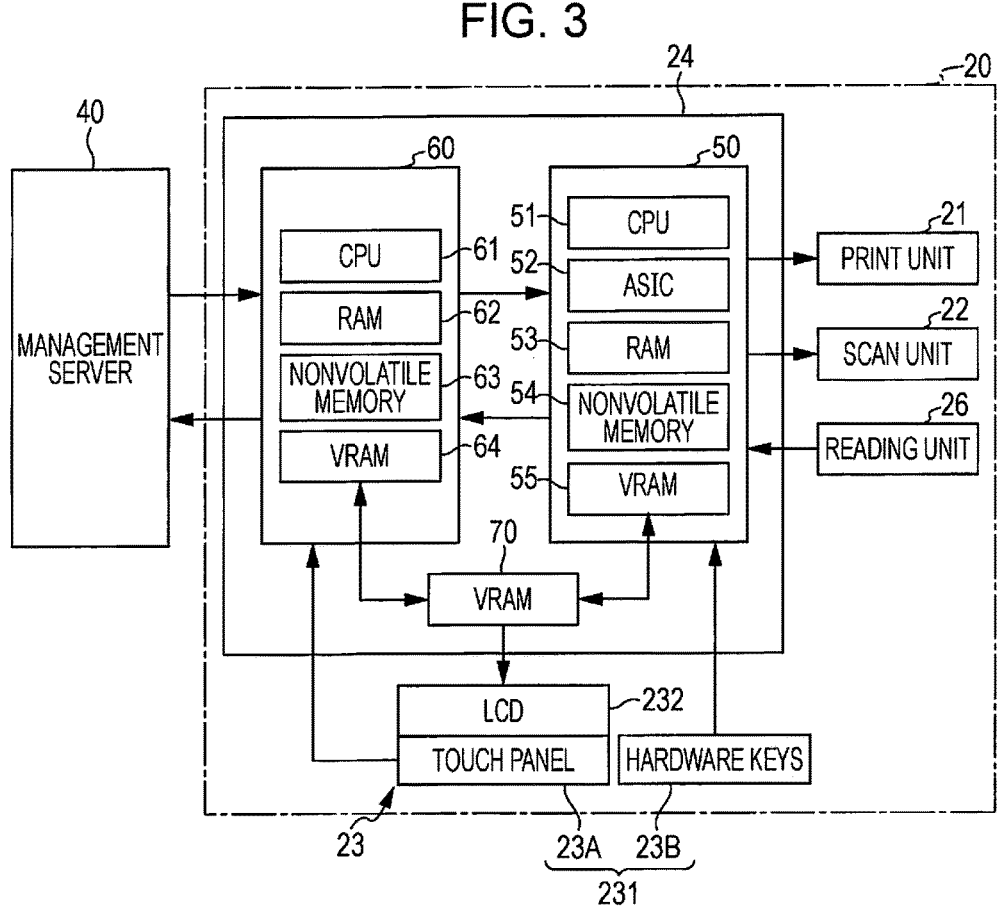
FIG. 3 is a block diagram illustrating a schematic configuration of a multifunction machine.

Next, the control device 24 of the multifunction machine 20 is described referring to FIG. 3.

As illustrated in FIG. 3, the control device 24 includes a multi-core processor. Then, among multiple (control circuits 50 and 60 (two control circuits in this case) that make up the control device 24, a first control circuit 50 manages control of the multifunction machine 20 and a second control circuit 60 manages communication with the management server 40. The control circuits 50 and 60 are configured in such a manner that the control circuits 50 and 60 input and output information to and from each other.

When the user, for example, makes a request to perform the printing, the first control circuit 50 performs the printing on the medium by controlling the print unit 21. Furthermore, when the user, for example, makes a request to perform the copying, the first control circuit 50 performs the copying by controlling the print unit 21 and the scanning unit 22.

When the hardware key 23B of the operation unit 231 of the user interface 23 is operated, the key operation data relating to the operation of the hardware key 23B is input, as the input data, into the first control circuit 50.

The first control circuit 50 has a CPU 51, an ASIC 52, a RAM 53, a nonvolatile memory 54, and a VRAM 55. The "ASIC" is short for an "application-specific IC" and the "VRAM" is short for a video random access memory." Various programs that are executed by the CPU 51, necessary pieces of setting data, and the like are stored in the nonvolatile memory 54. Various programs that are executed by the CPU 51 and pieces of data such as various operation results are temporarily stored in the RAM 53. Included in the VRAM 55 is screen data (which is hereinafter referred to as "native screen data") that is data relating to a native screen which is displayed by the first control circuit 50 on the display unit 232. Moreover, the native screen includes a screen that is prepared in advance in the multifunction machine 20.

The second control circuit 60 has a CPU 61, a RAM 62, a nonvolatile memory 63, and a VRAM 64. Various programs that are executed by the CPU 61, necessary setting data, and the like are stored in the nonvolatile memory 63. Various programs that are executed by the CPU 61 and pieces of data such as various operation results are temporarily stored in the RAM 62. Included in the VRAM 64 is screen data (which is hereinafter referred to as "browser screen data") that is data relating to a browser screen which is displayed by the second control circuit 60 on the display unit 232. Moreover, the browser screen data is screen data that is received (downloaded) from a URL that is designated by the management server 40, and the browser screen data that is received from the management server 40 in the VRAM 64 in the second control circuit 60. The "URL" is short for a "uniform resource locator."

Furthermore, when the touch panel 23A of the operation unit 231 of the user interface 23 is operated, the panel operation data relating to the operation of the touch panel 23A is input, as the input data, into the second control circuit 60. Then, the second control circuit 60 transmits the panel operation data that is input, to the management server 40, or outputs the panel operation data that is input, to the first control circuit 50.

Furthermore, in addition to the VRAM 55 of the first control circuit 50 and the VRAM 64 of the second control circuit 60, the control device 24 has a VRAM 70. Included in the VRAM 70 is screen data relating to a screen that is displayed on the display unit 232. It is possible for both of the first control circuit 50 and the second control circuit 60 to have access to the VRAM 70. Then, the first control circuit 50 and the second control circuit 60 each have a display control driver for controlling the display unit 232. For this reason, in the multifunction machine 20 according to the present embodiment, display control is possible with the first control circuit 50 and the display control is possible with the second control circuit 60.

Specifically, the first control circuit 50 determines by which control circuit the display control is performed. That is, the first control circuit 50 manages the right to control the display unit 232. For example, in a case where the first control circuit 50 has the right to control, the first control circuit 50 stores the native screen data in the VRAM 70, and displays the native screen that is based on the native screen data, on the display unit 232. On the other hand, in a case where the first control circuit 50 hands over the right to control to the second control circuit 60, the second control circuit 60 stores the browser screen data that is received from the management server 40 and that is stored in the VRAM 64 of the second control circuit 60 itself, in the VRAM 70. Then, the second control circuit 60 displays the browser screen that is based on the browser screen data which is stored in the VRAM 70, on the display unit 232.

Figure 4:
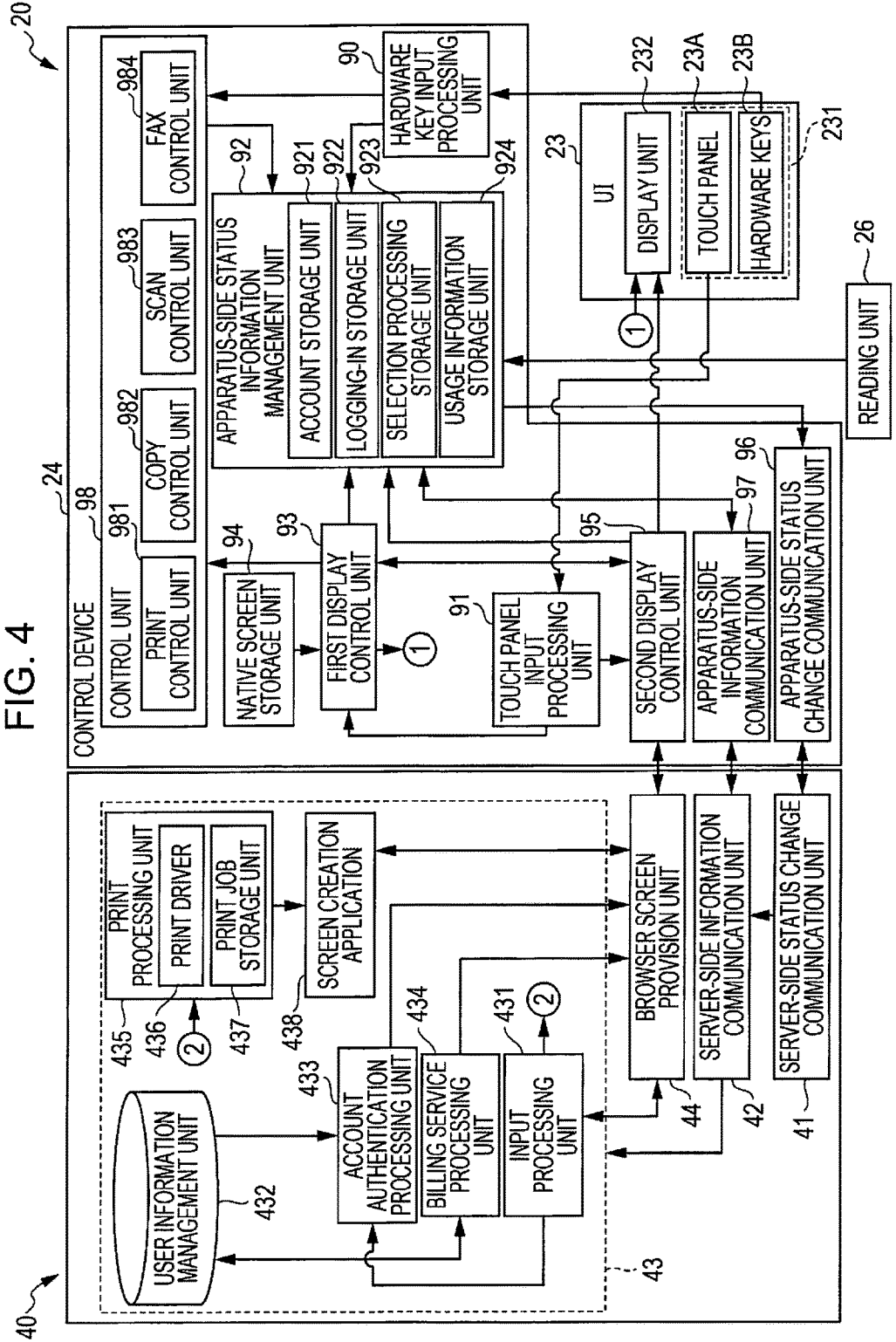
FIG. 4 is a block diagram illustrating functional configurations of both of a control device of the multifunction machine and a management server.

Next, a functional configuration of the control device 24 of the multifunction machine 20 is described referring to FIG. 4.

As illustrated in FIG. 4, the control device 24 of the multifunction machine 20 has a hardware key input processing unit 90, a touch panel input processing unit 91, an apparatus-side status information management unit 92, a first display control unit 93, a native screen storage unit 94, a second display control unit 95, an apparatus-side status change communication unit 96, an apparatus-side information communication unit 97, and a control unit 98, as functional units that are configured in at least one of software and hardware.

The hardware key input processing unit 90 is configured from a driver circuit that makes up the first control circuit 50, and the CPU 51 of the first control circuit 50, which executes a predetermined program. When the user operates the hardware key 23B, hardware key operation data is input from the user interface 23 into the hardware key input processing unit 90. Then, the hardware key input processing unit 90 analyzes the hardware key operation data that is input, and outputs a result of the interpretation to the apparatus-side status information management unit 92 or to the control unit 98.

For example, in a case where, with the result of the interpretation of the hardware key operation data, the hardware key input processing unit 90 can know the user selected processing (printing, copying, or the like) that the multifunction machine 20 would be caused to perform, the hardware key input processing unit 90 outputs the processing selected by the user to the apparatus-side status information management unit 92 outputs. Furthermore, in a case where, with the result of the interpretation of the hardware key operation data, the hardware key input processing unit 90 can know that the user determined a condition (for example, the number of copies) of the processing that the multifunction machine 20 would be caused to perform, and in a case where the user selected the determination for the performing of the processing, the hardware key input processing unit 90 outputs a report to that effect to the control unit 98. Furthermore, in the case where, with the result of the interpretation of the hardware key operation data, the hardware key input processing unit 90 can know that the user made a request to log out of the multifunction machine 20, the hardware key input processing unit 90 outputs a report to that effect to the apparatus-side status information management unit 92.

The touch panel input processing unit 91 is configured from the driver circuit that makes up the second control circuit 60, and the CPU 61 of the second control circuit 60, which executes a predetermined program. When the user operates the touch panel 23A, the panel operation data is input from the user interface 23 to the touch panel input processing unit 91. Then, when the browser screen is displayed on the display unit 232, the touch panel input processing unit 91 outputs the panel operation data that is input, to the second display control unit 95. When this is done, the panel operation data is transmitted from the second display control unit 95 to the management server 40. That is, the operation that the user performs on the touch panel 23A under a situation where the browser screen is displayed on the display unit 232 is one example of a "second user operation" that does not change status information which is managed by the multifunction machine 20.

Furthermore, when the native screen is displayed on the display unit 232, the touch panel input processing unit 91 outputs the panel operation data to the first display control unit 93. When this is done, the panel operation data is interpreted in the first display control unit 93, and processing according to the result of the interpretation is performed on the first display control unit 93.

The apparatus-side status information management unit 92 is configured from the CPU 51 of the first control circuit 50, which executes a predetermined program, and the RAM 53 of the first control circuit 50. The apparatus-side status information management unit 92 includes an account storage unit 921, a logging-in storage unit 922, a selection processing storage unit 923, and a usage information storage unit 924.

The account that is read by the reading unit 26 is stored in the account storage unit 921. Then, when the account is written to the account storage unit 921, the apparatus-side status information management unit 92 outputs a report to the effect that the status information (that is, the status information that is managed by the multifunction machine 20) that is managed in the apparatus-side status information management unit 92 itself is changed, to the apparatus-side status change communication unit 96. That is, the operation that is performed by the user to cause the reading unit 26 to read an account on the authentication card 15 is one example of a "first user operation" that changes the status information which is managed by the multifunction machine 20 (for more detail, by the apparatus-side status information management unit 92 that will be described below). Moreover, when the user logs out of the multifunction machine 20, an account that is stored in the account storage unit 921 is removed, that is, the account storage unit 921 is reset.

When the user logs in to the multifunction machine 20, a logging-in status is stored in the logging-in storage unit 922. On the other hand, when a logging-out key 84 is operated, a logging-out status is stored in the logging-in storage unit 922. Then, when a status of storage contents of the logging-in storage unit 922 is changed from the logging-in status to the logging-out status, and is changed from the logging-out status to the logging-in status, the apparatus-side status information management unit 92 outputs a report to the effect that the status information (that is, the status information that is managed in the multifunction machine 20) which is managed by the apparatus-side status information management unit 92 itself is changed, to the apparatus-side status change communication unit 96. That is, the operation that the user performs on the logging-out key 84 in order to log out of the multifunction machine 20 (that is, the logging-out operation) is one example of the "first user operation."

Processing (for example, copying or printing) that is selected by the user is stored in the selection processing storage unit 923. Then, when processing that is selected by the user is written to the selection processing storage unit 923, the apparatus-side status information management unit 92 outputs a report to the effect that the status information (that is, the status information that is managed by the multifunction machine 20) which is managed in the apparatus-side status information management unit 92 itself is changed, to the apparatus-side status change communication unit 96. That is, the operation that the user performs on the hardware key 23B in order to select the processing (the copying or the like) that the multifunction machine 20 is caused to perform is one example of the "first user operation."

When the performing of the processing such as the copying is finished in the multifunction machine 20, usage information relating to the processing is stored in the usage information storage unit 924. Then, when new usage information is written to the usage information storage unit 924, the apparatus-side status information management unit 92 outputs a report to the effect that the status information (that is, the status information that is managed by the multifunction machine 20) which is managed in the apparatus-side status information management unit 92 itself is changed, to the apparatus-side status change communication unit 96.

The first display control unit 93 displays the native screen that is based on the native screen data which is prepared in the multifunction machine 20, on the display unit 232. That is, multiple types of native screen data are stored in the native screen storage unit 94. Then, the first display control unit 93 reads the native screen data from the native screen storage unit 94, and displays the native screen that is based on the native screen data, on the display unit 232. That is, the native screen storage unit 94 is configured from the VRAM 55 of the first control circuit 50, and the first display control unit 93 is configured from a display driver of the first control circuit 50, the CPU 51 of the first control circuit 50, which executes a predetermined, and the VRAM 70.

Furthermore, when the native screen is displayed on the display unit 232, the panel operation data is input into the first display control unit 93 through the touch panel input processing unit 91. Then, the first display control unit 93 interprets the panel operation data that is input, and outputs a result of the interpretation to the apparatus-side status information management unit 92 or to the control unit 98. For example, in a case where the panel operation data that is input is data relating to the status information that is managed in the apparatus-side status information management unit 92, the first display control unit 93 outputs the result of the interpretation to the apparatus-side status information management unit 92. The operation that the user performs on the touch panel 23A in order to select the processing (the copying or the like) that the multifunction machine 20 is caused to perform under a situation that the native screen is displayed on the display unit 232 in this manner is one example of the "first user operation."

Furthermore, in a case where the panel operation data that is input is data for making a request to perform the processing, the first display control unit 93 outputs a signal for making a request to perform the processing (for example, the copying) that is selected, to the control unit 98.

Furthermore, in a case where the right to control the display unit 232 is handed over to the second display control unit 95, the first display control unit 93 outputs a report to that effect to the second display control unit 95. Furthermore, in a case where the right to control the display unit 232 is returned to itself (that is, the first display control unit 93), the first display control unit 93 outputs a report to that effect to the second display control unit 95.

The second display control unit 95 is configured from a display driver of the second control circuit 60, the CPU 61 of the second control circuit 60, which executes a predetermined program, and the VRAM 70. The second display control unit 95 displays the browser screen that is based on the browser screen data which is received from the management server 40, on the display unit 232. That is, when a browser screen of a URL that is designated by the management server 40 is requested, the second display control unit 95 receives (downloads) browser screen data relating to the browser screen from the management server 40. Then, the second display control unit 95 displays the browser screen that is based on the browser screen data that is received, on the display unit 232.

Moreover, when the management server 40 permits the user to log in to the multifunction machine 20, the second display control unit 95 receives a logging-in request notification from the management server 40. This will be described in detail below. In this case, the second display control unit 95 outputs the logging-in request notification to the apparatus-side status information management unit 92. When this is done, the apparatus-side status information management unit 92 writes the logging-in status to the logging-in storage unit 922.

Conversely, when the management server 40 permits the user to log out of the multifunction machine 20, the second display control unit 95 receives a logging-out request notification from the management server 40. In this case, the second display control unit 95 outputs the logging-out request notification to the apparatus-side status information management unit 92. When this is done, the apparatus-side status information management unit 92 writes the logging-out status to the logging-in storage unit 922.

Furthermore, in a case where the browser screen is displayed on the display unit 232, the panel operation data is input from the touch panel input processing unit 91 into the second display control unit 95. Then, the second display control unit 95 transmits the panel operation data to the management server 40.

The apparatus-side status change communication unit 96 is configured from the CPU 61 of the second control circuit 60, which executes a predetermined program. When the status information that is managed by the apparatus-side status information management unit 92 is changed with the operation that the user performs on the multifunction machine 20, the apparatus-side status change communication unit 96 transmits a status change notification to the management server 40. That is, when an account is written to the account storage unit 921, the apparatus-side status change communication unit 96 transmits the status change notification to the management server 40. Furthermore, when the storage contents of the logging-in storage unit 922 are changed, the apparatus-side status change communication unit 96 transmits the status change notification to the management server 40. Furthermore, when processing (for example copying) that is selected by the user is written to the selection processing storage unit 923, the apparatus-side status change communication unit 96 transmits the status change notification to the management server 40. Furthermore, when the usage information is written to the usage information storage unit 924, the apparatus-side status change communication unit 96 transmits the status change notification to the management server 40.

Moreover, the status change notification is a signal for transferring to the management server 40 a report to the effect that some type of status information which is managed by the apparatus-side status information management unit 92 is changed. For this reason, only with the reception of the status change notification by the management server 40, the management server 40 cannot know which status information (for example, storage contents of the account storage unit 921) is changed.

The apparatus-side information communication unit 97 is configured from the CPU 61 of the second control circuit 60, which executes a predetermined program. When receiving a request notification from the management server 40, the apparatus-side information communication unit 97 transmits a response to the request notification to the management server 40. That is, when receiving a type request notification that is a request notification that a type of status information that is changed is requested, among various pieces of status information that are managed by the apparatus-side status information management unit 92, the apparatus-side information communication unit 97 makes an inquiry to the apparatus-side status information management unit 92 and thus acquires the changed status information. Then, the apparatus-side information communication unit 97 transmits data relating to the type of status information that is changed, to the management server 40. For example, in a case where the storage contents of the account storage unit 921 are changed, when receiving the type request notification, the apparatus-side information communication unit 97 makes an inquiry to the apparatus-side status information management unit 92 and thus acquires information indicating that the type of status information that is changed is the storage contents of the account storage unit 921. Then, the apparatus-side information communication unit 97 transmits a report to the effect that the storage contents of the account storage unit 921 are changed, that is, a report to the effect that an account is read by the reading unit 26, to the management server 40.

Furthermore, when receiving a contents request notification that is a request notification that the contents of changed status information are requested, the apparatus-side information communication unit 97 makes an inquiry to the apparatus-side status information management unit 92 and thus acquires the contents of the status information that is changed. Then, the apparatus-side information communication unit 97 transmits data relating to the contents of the status information that are changed, to the management server 40. For example, in a case where the storage contents of the account storage unit 921 are changed, when receiving the contents request notification, the apparatus-side information communication unit 97 makes an inquiry to the apparatus-side status information management unit 92 and thus acquires the account that is stored in the account storage unit 921. Then, the apparatus-side information communication unit 97 transmits data relating to the acquired account to the management server 40.

The control unit 98 is configured from the CPU 51 of the first control circuit 50, which executes a predetermined program, and the ASIC 52 of the first control circuit 50. The control unit 98 includes a print control unit 981, a copy control unit 982, a scan control unit 983, and a FAX control unit 984.

Then, when printing is requested, the print control unit 981 receives a print job from the management server 40, and performs the printing that is based on the print job. When copying is requested, the copy control unit 982 controls the print unit 21 and the scanning unit 22 and thus performs the copying.

When scanning is requested, the scan control unit 983 controls the scanning unit 22 and thus performs the scanning, and transmits image data that is acquired to the information terminal 12. The information terminal 12, which is a transmission target, is selectable by the operation of the operation unit 231 by the user.

When the FAX is requested, the FAX control unit 984 controls the scanning unit 22 and thus reads an image that is recorded in a medium, and transmits image data that is acquired, as FAX data, to a transmission destination.

Next, a functional configuration of a computer that makes up the management server 40 is described referring to FIG. 4.

As illustrated in FIG. 4, the computer of the management server 40 has a server-side status change communication unit 41, a server-side information communication unit 42, a server-side processing unit 43, and a browser screen provision unit 44, as functional units that are configured in at least one of software and hardware.

When receiving the status change notification from the apparatus-side status change communication unit 96 of the multifunction machine 20, the server-side status change communication unit 41 transmits a response signal to the apparatus-side status change communication unit 96. Furthermore, when receiving the status change notification, the server-side status change communication unit 41 outputs a report to the effect that the status change notification is received, to the server-side information communication unit 42.

When the server-side status change communication unit 41 receives the status change notification, the server-side information communication unit 42 transmits the request notification to the apparatus-side information communication unit 97 of the multifunction machine 20, which transmits the status change notification, and receives the response to the request notification from the apparatus-side information communication unit 97. Then, the server-side information communication unit 42 outputs the received response to the server-side processing unit 43.

That is, when the notification that the status change notification is received is input from the server-side status change communication unit 41, the server-side information communication unit 42 transmits the type request notification to the apparatus-side information communication unit 97. When this is done, the server-side information communication unit 42 receives the data relating to the type of status information that is changed, as a response to the type request notification, from the apparatus-side information communication unit 97. For example, in a case where the status change notification that results each time account is written to the account storage unit 921 is received from the multifunction machine 20, the server-side information communication unit 42, when transmitting the type request notification to the multifunction machine 20, receives a report to the effect that the storage contents of the account storage unit 921 are changed, as the response to the type request notification, from the multifunction machine 20.

Subsequently, when receives the data relating to the type of status information that is changed, as the response to the type request notification, the server-side information communication unit 42 transmits the contents request notification to the apparatus-side information communication unit 97. When this is done, the server-side information communication unit 42 receives the data relating to the contents of the status information that is changed, as a response to the contents request notification, from the apparatus-side information communication unit 97. For example, in a case where the report to the effect that the storage contents of the account storage unit 921 are changed is received, as the response to the type request notification, from the multifunction machine 20, the server-side information communication unit 42 when transmitting the contents request notification to the multifunction machine 20, receives data relating to the account that is stored in the account storage unit 921, as the response to the contents request notification, from the multifunction machine 20.

The server-side processing unit 43 includes an input processing unit 431, a user information management unit 432, an account authentication processing unit 433, a billing service processing unit 434, a print processing unit 435, and a screen creation application 438.

The input processing unit 431 performs processing according to the response that is input from the server-side information communication unit 42. For example, in a case where the storage contents of the account storage unit 921 are changed, the notification that the storage contents of the account storage unit 921 are changed and the data relating to the account that is stored in the account storage unit 921 are input into the input processing unit 431. In this case, the input processing unit 431 outputs the data relating to the account to the account authentication processing unit 433.

Furthermore, in a case where the storage contents of the logging-in storage unit 922 are changed, a notification that the storage contents of the logging-in storage unit 922 and data relating to the contents that are stored in the logging-in storage unit 922 are input into the input processing unit 431. For example, in a case where the logging-in status is stored in the logging-in storage unit 922, the input processing unit 431 determines that the user successfully logs in to the multifunction machine 20. On the other hand, in a case where the logging-out status is stored in the logging-in storage unit 922, the input processing unit 431 recognizes that the user makes a request to log out of the multifunction machine 20, and outputs a result of the recognition to the browser screen provision unit 44. In this respect, when the user operates the logging-out key 84, that is, when the logging-out operation is performed, the input processing unit 431 functions as one example of a "logging-out permission unit" that performs the user to log out of the multifunction machine 20.

Furthermore, in a case where storage contents of the selection processing storage unit 923 are changed, a notification that the storage contents of the selection processing storage unit 923 are changed, and data relating to processing that is stored in the selection processing storage unit 923 are input into the input processing unit 431. For example, in a case where print is stored in the selection processing storage unit 923, that is, in a case where the user requests the printing, the input processing unit 431 outputs a report to that effect to the print processing unit 435. When this is done, in the print processing unit 435, data relating to the print job that corresponds to the printing that is requested by the user is output to the screen creation application 438, and in the screen creation application 438, the browser screen for selecting the print job is created. Then, under a situation where the browser screen is displayed on the display unit 232 of the multifunction machine 20, when the print job of performing the print actually is selected by the user, data relating to the selected print job is input from the multifunction machine 20 through the browser screen provision unit 44 to the input processing unit 431. When this is done, the input processing unit 431 instructs the print processing unit 435 to perform the printing that is based on the print job which is selected by the user.

Furthermore, in a case where the reception-non-required processing, such as printing, is stored in the selection processing storage unit 923, that is, in a case where the user requests the reception-non-required processing, such as printing, the input processing unit 431 outputs a report to that effect to the browser screen provision unit 44.

Furthermore, in a case where storage contents of the usage information storage unit 924 are changed, a notification that the storage contents of the usage information storage unit 924 are changed, and data relating to usage information that is stored in the usage information storage unit 924 are input into the input processing unit 431. Then, the input processing unit 431 outputs the data relating to the usage information to the billing service processing unit 434.

The user information management unit 432 has a management table that is illustrated in FIG. 5. As illustrated in FIG. 5, with the management table, management is performed in a state where all users who can use the status management system 10 according to the present embodiment are divided into multiple groups (two groups, in this case). With the management table, a balance is managed for every group. That is, a balance for a first group G(1) is a first balance A(1), and a second group G(2) is a second balance A(2). Furthermore, with the management table, a user name and an account are managed being associated with each other. That is, an account corresponding to a user name "OOOO" that belongs to the first group G(1) is a 11st account X(11), and an account corresponding to a user name "OXOX" that belongs to the first group G(1) is a 12th account X(12). Furthermore, an account corresponding to a user name "ΔΔΔΔ" that belongs to the second group G(2) is a 21st account X(21), and an account corresponding to a user name "ΔXΔX" that belongs to the second group G(2) is a 22nd account X(22).

Referring back to FIG. 4, when the data relating to the account is input from the input processing unit 431, the account authentication processing unit 433 performs authentication processing using the management table that is illustrated in FIG. 5. In the authentication processing, it is determined whether or not an account that is based on data which is input is among multiple accounts that are managed with the management table. Then, in a case where an account that is read by the reading unit 26 is among the multiple accounts that are managed with the management table, the account authentication processing unit 433 outputs a report to the effect that the user is permitted to log in to the multifunction machine 20 to the browser screen provision unit 44.

When the data relating to the usage information is input from the input processing unit 431, the billing service processing unit 434 performs billing service processing using the management table that is illustrated in FIG. 5. In the billing service processing, a balance is updated based on the usage information that is input. For example, in a case where the user who belongs to the first group G(1) causes the multifunction machine 20 to perform copying, the first balance A(1) that is a balance for the first group G(1) is reduced by an amount of money that corresponds to the number of copies that are made. Then, the billing service processing unit 434 outputs a result of the billing service processing to the browser screen provision unit 44. In this respect, the billing service processing unit 434 is configured to be one example of a "usage information processing unit" that performs processing according to the usage information that is stored in the usage information storage unit 924 of the multifunction machine 20.

The print processing unit 435 has a print driver 436 and a print job storage unit 437. The received print job is stored in the print job storage unit 437, being associated with the information terminal 12 that transmits the print job, that is, with the user. Furthermore, when printing is requested from the multifunction machine 20, the print job storage unit 437 creates a list of print jobs relating to the user who logs in to the multifunction machine 20, and outputs print job list data, which is data relating to the list of print jobs, to the screen creation application 438.

When the data relating to the print job that is selected as a print target, is input from the input processing unit 431, the print driver 436 reads the selected print job from the print job storage unit 437, and converts the print job into data that is usable in the multifunction machine 20. Then, the print driver 436 transmits a post-conversion print job to the control unit 98 of the multifunction machine 20.

The screen creation application 438 creates a browser screen, and manages the browser screen in a state of being associated with a URL. For example, the screen creation application 438 creates a browser screen for presenting processing operations that are selectable by the user in the multifunction machine 20, and a browser screen for guiding a balance for a group to which the user who uses the multifunction machine 20 belongs. Furthermore, when the job list data is input from the print processing unit 435, the screen creation application 438 creates a browser screen for displaying print jobs in the form of a list that are selectable by the user who logs in to the multifunction machine 20.

The browser screen provision unit 44 transmits the browser screen data that is created in the screen creation application 438 or data relating to a URL that is positional information on the browser screen, to the second display control unit 95 of the multifunction machine 20. That is, the browser screen provision unit 44 transmits the data relating to the URL that is the positional information on the designated browser screen, to the second display control unit 95. For example, when the report to the effect that the user is permitted to login in to the multifunction machine 20 is input from the account authentication processing unit 433, the browser screen provision unit 44 transmits data relating to a URL of the browser screen for presenting the processing operations that are selectable by the user in the multifunction machine 20, to the second display control unit 95. Furthermore, when receiving a report to the effect that the user makes a request to perform the printing, from the multifunction machine 20, the browser screen provision unit 44 transmits the data relating to the URL of the browser screen on which the print jobs that are selectable by the user are displayed in the form of a list, to the second display control unit 95. Furthermore, when a result of the billing service processing is input from the billing service processing unit 434, the browser screen provision unit 44 transmits to the second display control unit 95 the data relating to the URL of the browser screen for providing guidance on the balance for the group to which the user who uses the multifunction machine 20 belongs.

Moreover, when the data relating to the URL is transmitted in this manner, the native screen is displayed on the display unit 232 of the multifunction machine 20. In this case, along with the data relating the URL, the browser screen provision unit 44 transmits a switching request to the effect that a request for switching a screen which is displayed on the display unit 232 from the native screen to the browser screen is made, to the multifunction machine 20. In this respect, the browser screen provision unit 44 is configured to be one example of a "switching request unit" that makes a request to switch one screen of the native screen and the browser screen that are displayed on the display unit 232 to the other. However, when the data relating to the URL is transmitted, in a case where the browser screen is displayed on the display unit 232 of the multifunction machine 20, the browser screen provision unit 44 does not transmit the switching request.

Then, when receiving from the second display control unit 95 a report to the effect that the browser screen of the URL that is designated by the browser screen provision unit 44 itself is requested, the browser screen provision unit 44 transmits browser screen data relating to the browser screen of the URL to the second display control unit 95.

Moreover, with a user operation that is performed under a situation where the browser screen displayed on the display unit 232 of the multifunction machine 20, a screen of the display unit 232 is switched from the browser screen to the native screen. For example, under a situation where the browser screen for presenting the processing operations that are selectable by the user in the multifunction machine 20 is displayed on the display unit 232, in a case where the reception-non-required processing is selected, there occurs a need to switch the screen of the display unit 232 from the browser screen to the native screen. In this case, when a notification that the reception-non-required processing such as the copy is selected is input from the input processing unit 431, the browser screen provision unit 44 transmits the switching request to the effect that a request for switching the screen which is displayed on the display unit 232 from the browser screen to the native screen, to the second display control unit 95 of the multifunction machine 20 is made. When this is done, in the multifunction machine 20, the switching request is output from the second display control unit 95 to the first display control unit 93, and thus the screen that is displayed on the display unit 232 is switched from the browser screen to the native screen.

Furthermore, for example, under a situation where the browser screen is displayed on the display unit 232 of the multifunction machine 20, the user operates the logging-out key 84. In this case, a notification that the user makes a request to log out of the multifunction machine 20 is input from the input processing unit 431 to the browser screen provision unit 44. Then, the browser screen provision unit 44 transmits the switching request to the effect that a request for switching the screen which is displayed on the display unit 232 from the native screen to the browser screen is made, to the second display control unit 95 of the multifunction machine 20. When this is done, in the multifunction machine 20, the switching request is output from the second display control unit 95 to the first display control unit 93, and thus the screen that is displayed on the display unit 232 is switched from the browser screen to the native screen.

Moreover, in a case where the switching request for switching from the browser screen to the native screen is transmitted in this manner, the browser screen provision unit 44 also transmits data relating to a condition parameter for specifying the native screen that is displayed on the display unit 232 of the multifunction machine 20, to the second display control unit 95. For example, in a case where, because the user selects copy, the switching request is transmitted, along with the switching request, the browser screen provision unit 44 transmits data to a condition parameter for specifying the native screen for selecting a copy condition, to the second display control unit 95.

Incidentally, the browser screen provision unit 44 receives the panel operation data from the second display control unit 95. In this case, the browser screen provision unit 44 transmits the received panel operation data to the input processing unit 431.

Next, a screen that is displayed on the display unit 232 of the multifunction machine 20 is described referring to FIGS. 6 to 10.

Figure 6:
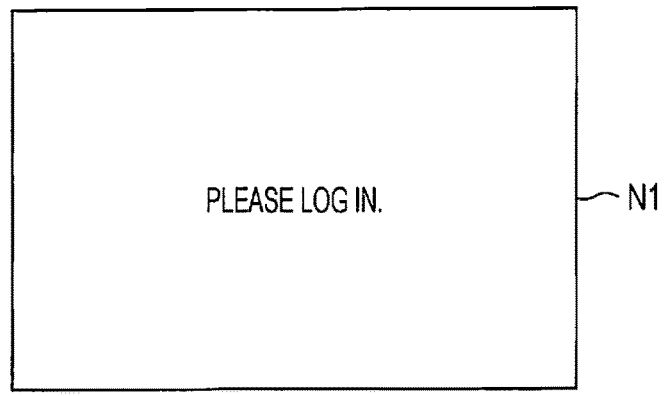
FIG. 6 is a diagram illustrating a screen that urges a user to log in to the multifunction machine.

A screen that is illustrated in FIG. 6 is a logging-in screen N1 that is displayed in order to urge the user to log in to the multifunction machine 20 when the user is going to log out of the multifunction machine 20. The logging-in screen N1 is the native screen that is prepared in advance in the control device 24 of the multifunction machine 20.

Figure 7:
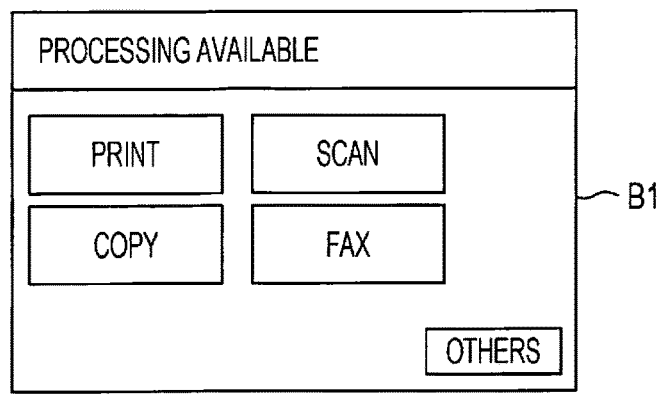
FIG. 7 is a diagram illustrating one example of a screen on which processing that is permitted to be performed in the multifunction machine is displayed.

A screen that is illustrated in FIG. 7 is one example of a processing selection screen B1 in a case where the user logs in to the multifunction machine 20. The "print," the "copy," the "scan," the "FAX," and others are displayed on the processing selection screen B1 in a selectable manner. Then, in a case where "Others" is selected on the processing selection screen B1, various maintenances and settings of the multifunction machine 20 are possible. Moreover, the processing selection screen B1 is the browser screen for presenting the processing operations that are selectable by the user in the multifunction machine 20.

Figure 8:
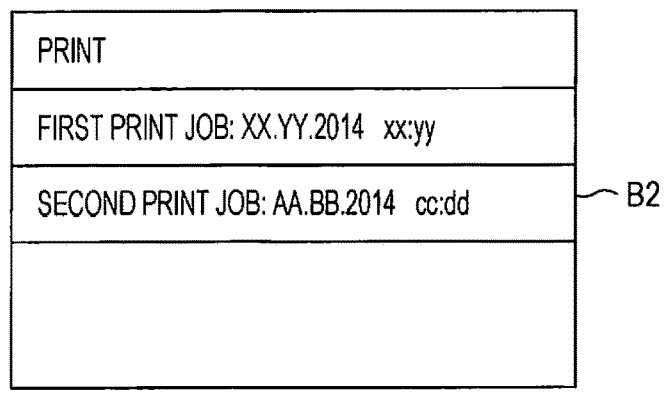
FIG. 8 is a diagram illustrating one example of a screen on which print jobs that are selectable are displayed in the form of a list.

A screen that is illustrated in FIG. 8 is one example of a screen in a case where the "Print" is selected on the processing selection screen B1. This screen is one example of a job list screen B2 that displays the print jobs in the form of a list that are selectable by the user. Moreover, the job list screen B2 is the browser screen for job selection, which is created in the management server 40.

Figure 9:
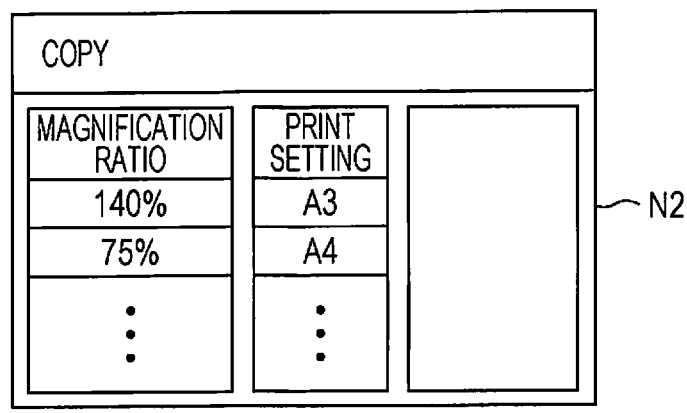
FIG. 9 is a diagram illustrating one example of a screen that urges a user to select various conditions before performing copying.

In a screen in FIG. 9 is one example of a screen in a case where the "copy" is selected on the processing selection screen B1. This screen is a condition selection screen N2 for urging the user to select various conditions (a magnification rate, a paper size, and the like) when performing the copying. Moreover, the condition selection screen N2 for urging the user to select a condition for performing the reception-non-required processing such as the copying is the native screen for selecting conditions that are prepared in advance in the multifunction machine 20.

Figure 10:
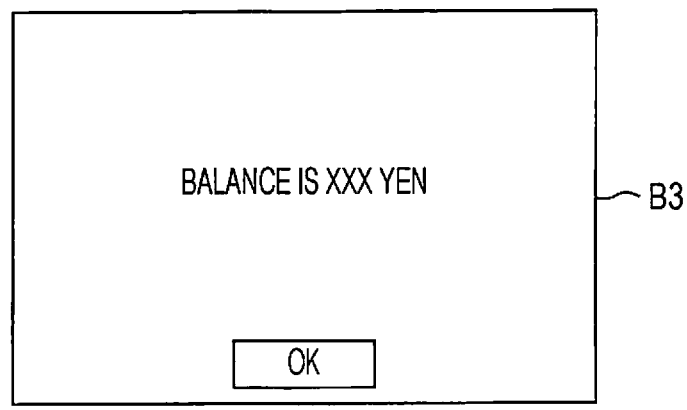
FIG. 10 is a diagram illustrating one example of a screen that provides guidance on the balance.

A screen in FIG. 10 is one example of a guidance screen B3 that is display unit 232 after the processing (the copying or the like) selected by the user is performed. The guidance screen B3 is a screen for providing the user with guidance on a result of performing the billing service processing. In FIG. 10, guidance on a balance is provided. The guidance screen B3 is the browser screen for providing guidance, which is created in the management server 40.

Figure 11:
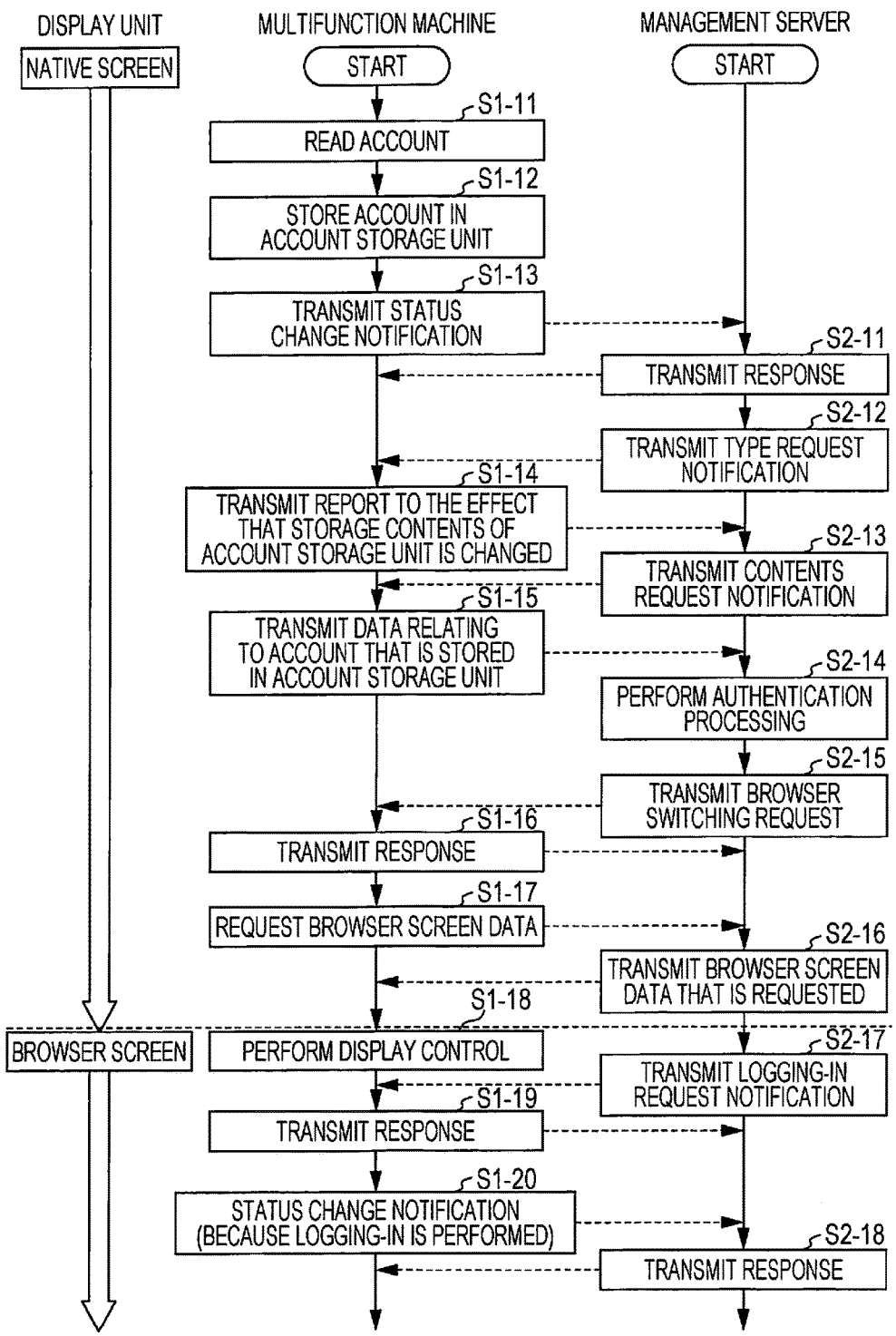
FIG. 11 is a flowchart for describing a procedure for processing that is performed when an account on an authentication card is read by a reading unit.

Next, referring to a flowchart that is illustrated in FIG. 11, a procedure for processing that is performed by the status management system 10 when the reading unit 26 reads the account on the authentication card 15 under a situation where the logging-in screen N1 which is one example of the native screen is displayed on the display unit 232 is described.

As illustrated in FIG. 11, when the user holds the authentication card 15 up over the reading unit 26 of the multifunction machine 20, the reading unit 26 of the multifunction machine 20 reads the account on the authentication card 15 (Step S1-11). When this is done, in the multifunction machine 20, the account that is read is stored in the account storage unit 921 of the apparatus-side status information management unit 92 (Step S1-12). Then, a notification that the status information that is managed in the multifunction machine 20 is changed is input from the apparatus-side status information management unit 92 to the apparatus-side status change communication unit 96, and the apparatus-side status change communication unit 96 transmits the status change notification to the management server 40 (Step S1-13). In this respect, Step S1-13 is equivalent to one example of an "apparatus-side status change communication step" in which the control device 24 of the multifunction machine 20 is caused to transmit the status change notification to the management server 40 when the status information that is managed by the multifunction machine 20 is changed by operating the multifunction machine 20.

When this is done, in the management server 40, the server-side status change communication unit 41 that receives the status change notification transmits the response signal as a response to the status change notification to the multifunction machine 20 (Step S2-11). The response signal is received in the apparatus-side status change communication unit 96. That is, in a case where the status information that is managed by the apparatus-side status information management unit 92 of the multifunction machine 20 is changed, the control device 24 of the multifunction machine 20 functions as a HTTP server, and the management server 40 functions as a HTTP client. Moreover, HTTP is short for hypertext transfer protocol.

Subsequently, in the management server 40, when the status change notification is received in the server-side status change communication unit 41, the server-side information communication unit 42 transmits the type request notification to the multifunction machine 20 (Step S2-12). In this respect, Step S2-12 is equivalent to one example of a "server-side request notification transmission step" in which the management server 40 is caused to transmit the request notification (the type request notification in this case) to the multifunction machine 20 when the status change notification is received from the control device 24 of the multifunction machine 20.

Then, in the multifunction machine 20, when the apparatus-side information communication unit 97 receives the type request notification, the apparatus-side information communication unit 97 makes an inquiry to the apparatus-side status information management unit 92, and acquires a report to the effect that the storage contents of the account storage unit 921 is changed. When this is done, the apparatus-side information communication unit 97 transmits the report to the effect that the storage contents of the account storage unit 921 is changed, as the response to the type request notification, to the management server 40 (Step S1-14). In this respect, Step S1-14 is equivalent to one example of an "apparatus-side information communication step" in which the control device 24 of the multifunction machine 20 is caused to transmit a response to the request notification to the management server 40 when the request notification (the type request notification in this case) is received from the management server 40. That is, after the management server 40 transmits the response to the status change notification from the multifunction machine 20, the control device 24 of the multifunction machine 20 functions as the HTTP client, and the management server 40 functions as the HTTP server.

When this is done, in the management server 40, the server-side information communication unit 42 receives the report to the effect that the storage contents of the account storage unit 921 is changed, as the response to the type request notification, and the server-side information communication unit 42 transmits the contents request notification to the multifunction machine 20 (Step S2-13). In this respect, Step S2-13 is equivalent to one example of the "server-side request notification transmission step" in which the management server 40 is caused to transmit the request notification (the contents request notification in this case) to the multifunction machine 20.

Then, in the multifunction machine 20, when the apparatus-side information communication unit 97 receives the contents request notification, the apparatus-side information communication unit 97 makes an inquiry to the apparatus-side status information management unit 92, and acquires the data relating to the account that is stored in the account storage unit 921. When this is done, the apparatus-side information communication unit 97 transmits the data relating to the account, as the response to the contents request notification, to the management server 40 (Step S1-15). In this respect, Step S1-15 is equivalent to one example of the "apparatus-side information communication step" in which the control device 24 of the multifunction machine 20 is caused to transmit a response to the request notification from the management server 40 when the request notification (the contents request notification in this case) is received from the management server 40.

When this is done, in the management server 40, the server-side information communication unit 42 receives the data relating to the account as the response to the contents request notification. Then, in the management server 40, the account authentication processing unit 433 performs the authentication processing to determine whether or not the account that is stored in the account storage unit 921 is among the accounts that are managed in the user information management unit 432 (Step S2-14). Then, in a case where the account that is stored in the account storage unit 921 is among the accounts that are managed in the user information management unit 432, the account authentication processing unit 433 permits the user to login in to the multifunction machine 20. When this is done, the notification that the user is permitted to log in to the multifunction machine 20 is input into the browser screen provision unit 44.

In this case, because the logging-in screen N1 that is the native screen is displayed on the display unit 232 of the multifunction machine 20, in the management server 40, the browser screen provision unit 44 transmits a browser switching request that is a request for switching the screen that is displayed on the display unit 232 from the native screen to the browser screen, to the multifunction machine 20 (Step S2-15). Moreover, in Step S2-15, data relating to a URL of the processing selection screen B1 is transmitted along with the browser switching request.

When this is done, in the multifunction machine 20, the second display control unit 95 receives both of the browser switching request and the data relating to the URL, and the second display control unit 95 transmits a response signal, as a response to the received data, to the management server 40 (Step S1-16). Then, the second display control unit 95 outputs a report to the effect that the browser switching request is received to the first display control unit 93, and makes a request to the management server 40 for the browser screen data relating to the browser screen of the URL that is designated in the management server 40 (Step S1-17). Incidentally, here, the browser screen that is requested by the second display control unit 95 is the processing selection screen B1 that is illustrated in FIG. 7.

Moreover, the first display control unit 93 into which the browser switching request is input terminates the display control for displaying the logging-in screen N1 on the display unit 232, and hands over the right to control the display unit 232 to the second display control unit 95.

On the other hand, in the management server 40, when the browser screen data is requested, the browser screen provision unit 44 transmits the requested browser screen data to the multifunction machine 20 (Step S2-16).

Then, in the multifunction machine 20, the second display control unit 95 receives (downloads) the browser screen data, and starts the display control (Step S1-18). Accordingly, the processing selection screen B1 relating to the received browser screen data is displayed on the display unit 232. That is, when Step S1-18 is performed, the screen of the display unit 232 is switched from the logging-in screen N1 (the native screen) to the processing selection screen B1 (the browser screen).

Furthermore, in the management server 40, because the notification that the user is permitted to log in to the multifunction machine 20 is input, the browser screen provision unit 44 transmits the logging-in request notification to the multifunction machine 20 (Step S2-17).

Then, in the multifunction machine 20, when the second display control unit 95 receives the logging-in request notification, the second display control unit 95 transmits a response signal, as a response to the logging-in request notification, to the management server 40 (Step S1-19). When in this manner, the second display control unit 95 receives the logging-in request notification, in the apparatus-side status information management unit 92, the logging-in status is written to the logging-in storage unit 922. That is, the status information that is managed by the apparatus-side status information management unit 92 is changed. For this reason, the apparatus-side status change communication unit 96 transmits the status change notification to the management server 40 (Step S1-20).

When this is done, in the management server 40, the server-side status change communication unit 41 receives the status change notification, and the server-side status change communication unit 41 transmits a response signal, as the response to the status change notification, to the multifunction machine 20 (Step S2-18).

Moreover, thereafter, communication is performed between the server-side information communication unit 42 (the HTTP server) of the management server 40 and the apparatus-side information communication unit 97 (the HTTP client) of the multifunction machine 20. Accordingly, the management server 40 can confirm that the logging-in status is written to the logging-in storage unit 922 of the multifunction machine 20, and can determine that logging in to the multifunction machine 20 is finished.

Figure 12:
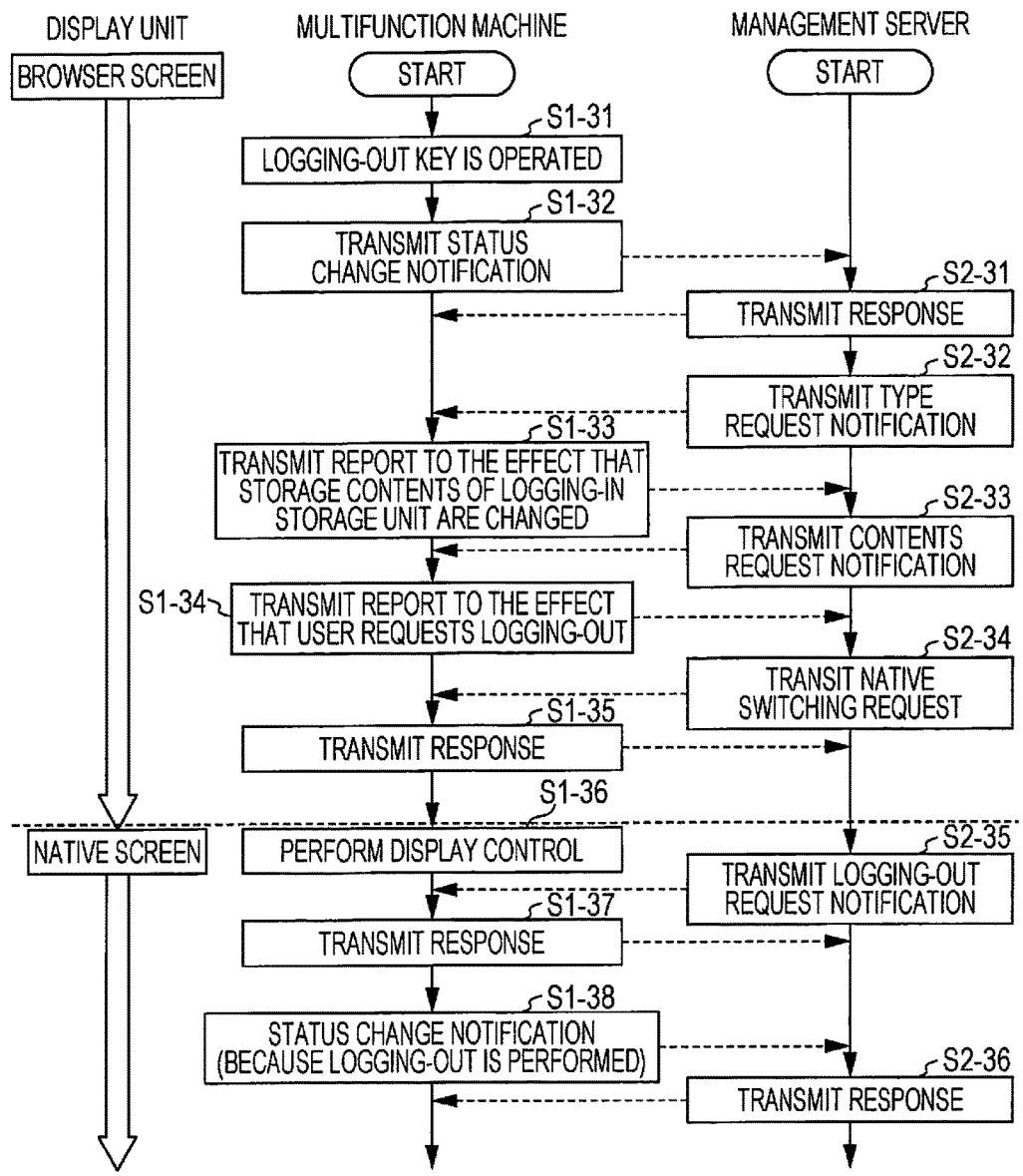
FIG. 12 is a flowchart for describing a procedure for processing that is performed when the user makes a request to log out of the multifunction machine.

Next, referring to a flow chart that is illustrated in FIG. 12, a procedure for processing that is performed by the status management system 10 when the user operates the logging-out key 84 under a situation where the processing selection screen B1 that is one example of the browser screen is displayed on the display unit 232 is described.

As illustrated in FIG. 12, in the multifunction machine 20, when the hardware key input processing unit 90 recognizes that the user operates the logging-out key 84 of the user interface 23, in the apparatus-side status information management unit 92, the logging-out status is written to the logging-in storage unit 922 (Step S1-31). Then, the notification that the status information that is managed in the multifunction machine 20 is changed is input from the apparatus-side status information management unit 92 to the apparatus-side status change communication unit 96, and the apparatus-side status change communication unit 96 transmits the status change notification to the management server 40 (Step S1-32). In this respect, Step S1-32 is also equivalent to one of the "apparatus-side status change communication step."

When this is done, in the management server 40, the server-side status change communication unit 41 that receives the status change notification transmits the response signal as a response to the status change notification to the multifunction machine 20 (Step S2-31). The response signal is received in the apparatus-side status change communication unit 96. That is, in the case where the status information that is managed by the apparatus-side status information management unit 92 of the multifunction machine 20 is changed, the control device 24 of the multifunction machine 20 functions as the HTTP server, and the management server 40 functions as the HTTP client.

Subsequently, in the management server 40, when the status change notification is received in the server-side status change communication unit 41, the server-side information communication unit 42 transmits the type request notification to the multifunction machine 20 (Step S2-32). In this respect, Step S2-32 is also equivalent to one example of the "server-side request notification transmission step" in which the management server 40 is caused to transmit the request notification (the type request notification in this case) to the multifunction machine 20.

Then, in the multifunction machine 20, when the apparatus-side information communication unit 97 receives the type request notification, the apparatus-side information communication unit 97 makes an inquiry to the apparatus-side status information management unit 92, and acquires a report to the effect that the logging-in contents of the logging-in storage unit 922 is changed. When this is done, the apparatus-side information communication unit 97 transmits the report to the effect that the storage contents of the logging-in storage unit 922 is changed, as the response to the type request notification, to the management server 40 (Step S1-33). In this respect, Step S1-33 is also equivalent to one example of the "apparatus-side information communication step" in which the control device 24 of the multifunction machine 20 is caused to transmit a response to the request notification from the management server 40 (the type request notification in this case) to the management server 40. That is, after the management server 40 transmits the response to the status change notification from the multifunction machine 20, the control device 24 of the multifunction machine 20 functions as the HTTP client, and the management server 40 functions as the HTTP server.

When this is done, in the management server 40, the server-side information communication unit 42 receives the report to the effect that the storage contents of the logging-in storage unit 922 is changed, as the response to the type request notification, and the server-side information communication unit 42 transmits the contents request notification to the multifunction machine 20 (Step S2-33). In this respect, Step S2-33 is also equivalent to one example of the "server-side request notification transmission step" in which the management server 40 is caused to transmit the request notification (the contents request notification in this case) to the multifunction machine 20.

Then, in the multifunction machine 20, when the apparatus-side information communication unit 97 receives the contents request notification, the apparatus-side information communication unit 97 makes an inquiry to the apparatus-side status information management unit 92, and acquires the storage contents (the logging-out status in the case) of the logging-in storage unit 922 is changed. When this is done, the apparatus-side information communication unit 97 transmits the storage contents of the logging-in storage unit 922 (the logging-out status in this case), that is, the report to the effect that the user makes a request to log out of the multifunction machine 20, as the response to the contents request notification, to the management server 40 (Step S1-34). In this respect, Step S1-34 is also equivalent to one example of the "apparatus-side information communication step" in which the control device 24 of the multifunction machine 20 is caused to transmit the response to the request notification from the management server 40 (the contents request notification in this case), to the management server 40.

When this is done, in the management server 40, the server-side information communication unit 42 receives the storage contents (the logging-out status in this case) of the logging-in storage unit 922, as the response to the contents request notification. In this case, in the management server 40, the input processing unit 431 knows that the user makes a request to log out of the multifunction machine 20. At this time, because the processing selection screen B1 that is one example of the browser screen is displayed on the display unit 232 of the multifunction machine 20, the browser screen provision unit 44 transmits a native switching request that is the switching request for switching the screen that is displayed on the display unit 232 from the browser screen to the native screen, to the multifunction machine 20 (Step S2-34). Incidentally, in a case where the native switching request is transmitted, the browser screen provision unit 44 also transmits to the multifunction machine 20 the data relating to the condition parameter for specifying the native screen (in this case, the native screen that is displayed when the user logs out of the multifunction machine 20) that is displayed on the display unit 232.

When this is done, in the multifunction machine 20, the second display control unit 95 receives the native switching request and the data relating to the condition parameter, and the second display control unit 95 transmits a response signal, as a response to the native switching request, to the management server 40 (Step S1-35). Then, the second display control unit 95 outputs a notification that the native switching request is received and data relating to the condition parameter, to the first display control unit 93. Furthermore, the second display control unit 95 that outputs the native switching request terminates the display control for displaying the processing selection screen B1 on the display unit 232, and returns the right to control the display unit 232 to the first display control unit 93.

Then, in the multifunction machine 20, the first display control unit 93 the native screen in accordance with the acquired condition parameter on the display unit 232 (Step S1-36) by starting the display control. For example, here, the first display control unit 93 displays the native screen including a message to the effect that the logging-out is finished on the display unit 232. That is, when Step S1-36 is performed, the screen of the display unit 232 is switched from the processing selection screen B1 (the browser screen) to the native screen.

Furthermore, in the management server 40, because a notification that logging out of the multifunction machine 20 is permitted is input, the browser screen provision unit 44 transmits the logging-out request notification to the multifunction machine 20 (Step S2-35).

Then, in the multifunction machine 20, when the second display control unit 95 receives the logging-out request notification, the second display control unit 95 transmits a response signal, as a response to the logging-out request notification to the management server 40 (Step S1-37). When the second display control unit 95 receives the logging-out request notification receives in this manner, in the apparatus-side status information management unit 92, the storage contents of the account storage unit 921 are reset. That is, the status information that is managed by the apparatus-side status information management unit 92 is changed. For this reason, the apparatus-side status change communication unit 96 transmits the status change notification to the management server 40 (Step S1-38).

When this is done, in the management server 40, the server-side status change communication unit 41 receives the status change notification, and the server-side status change communication unit 41 transmits a response signal, as the response to the status change notification, to the multifunction machine 20 (Step S2-36).

Moreover, thereafter, communication is performed between the server-side information communication unit 42 (the HTTP server) of the management server 40 and the apparatus-side information communication unit 97 (the HTTP client) of the multifunction machine 20. Accordingly, the management server 40 can confirm that the account storage unit 921 of the multifunction machine 20 is reset, and can determine that logging out of the multifunction machine 20 is finished.

Figure 13:
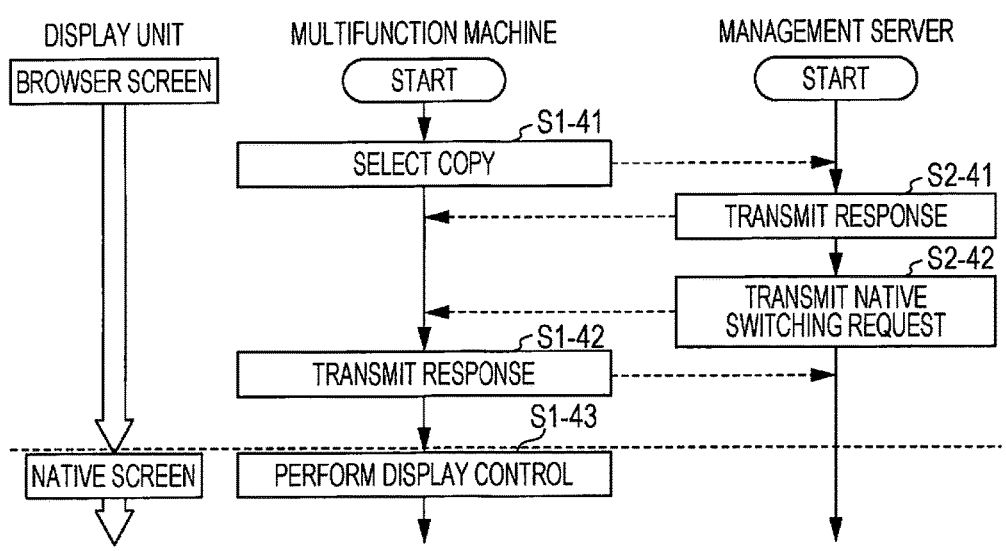
FIG. 13 is a flowchart for describing a procedure for processing that is performed when copy is selected by operating a touch panel.

Next, referring to a flowchart that is illustrated in FIG. 13, a procedure for processing that is performed by the status management system 10 when the copying that is one example of the reception-non-required processing is selected is selected by the operation of the touch panel 23A by the user under the situation where the processing selection screen B1 that is one example of the browser screen is displayed on the display unit 232 is described.

As illustrated in FIG. 13, in the multifunction machine 20, when the touch panel 23A of the user interface 23 is operated and the copying is selected from among the processing operations that are performable in the multifunction machine 20, the touch panel input processing unit 91 outputs the panel operation data to the second display control unit 95. When this is done, the second display control unit 95 transmits the panel operation data to the management server 40 (Step S1-41). Moreover, because under a situation where the browser screen is displayed on the display unit 232, the operation of the touch panel 23A is the second user operation, the status information that is managed by the apparatus-side status information management unit 92 is not changed. For this reason, in this case, the status change notification is not transmitted from the multifunction machine 20.

When this is done, in the management server 40, the browser screen provision unit 44 receives the panel operation data, and the browser screen provision unit 44 transmits a response signal, as a response to the panel operation data, to the multifunction machine 20 (Step S2-41). In this case, because the processing selection screen B1 is displayed on the display unit 232 of the multifunction machine 20, the browser screen provision unit 44 transmits the native switching request to the multifunction machine 20 (Step S2-42). Incidentally, in the case where the native switching request is transmitted, the browser screen provision unit 44 also transmits the multifunction machine 20 the data relating to the condition parameter for specifying the native screen (the condition selection screen N2 in this case) that is displayed on the display unit 232.

Moreover, here, a case where copy is selected is described above, but reception-non-required processing (for example, FAX) other than the copy is selected by the user, data relating to a condition parameter for specifying the native screen for the selected reception-non-required processing is transmitted along with the native switching request.

Then, in the multifunction machine 20, the second display control unit 95 receives the native switching request and the data relating to the condition parameter, and the second display control unit 95 transmits the response signal, as the response to the native switching request, to the management server 40 (Step S1-42). Then, the second display control unit 95 outputs a notification that the native switching request is received and data relating to the condition parameter, to the first display control unit 93. Furthermore, the second display control unit 95 that outputs the native switching request terminates the display control for displaying the processing selection screen B1 on the display unit 232, and returns the right to control the display unit 232 to the first display control unit 93.

Then, in the multifunction machine 20, the first display control unit 93 displays the condition selection screen N2 that is one example of the native screen in accordance with the acquired condition parameter, on the display unit 232 by starting the display control (Step S1-43). That is, when Step S1-43 is performed, the screen of the display unit 232 is switched from the processing selection screen B1 (the browser screen) to the condition selection screen N2 (the native screen).

Figure 14:
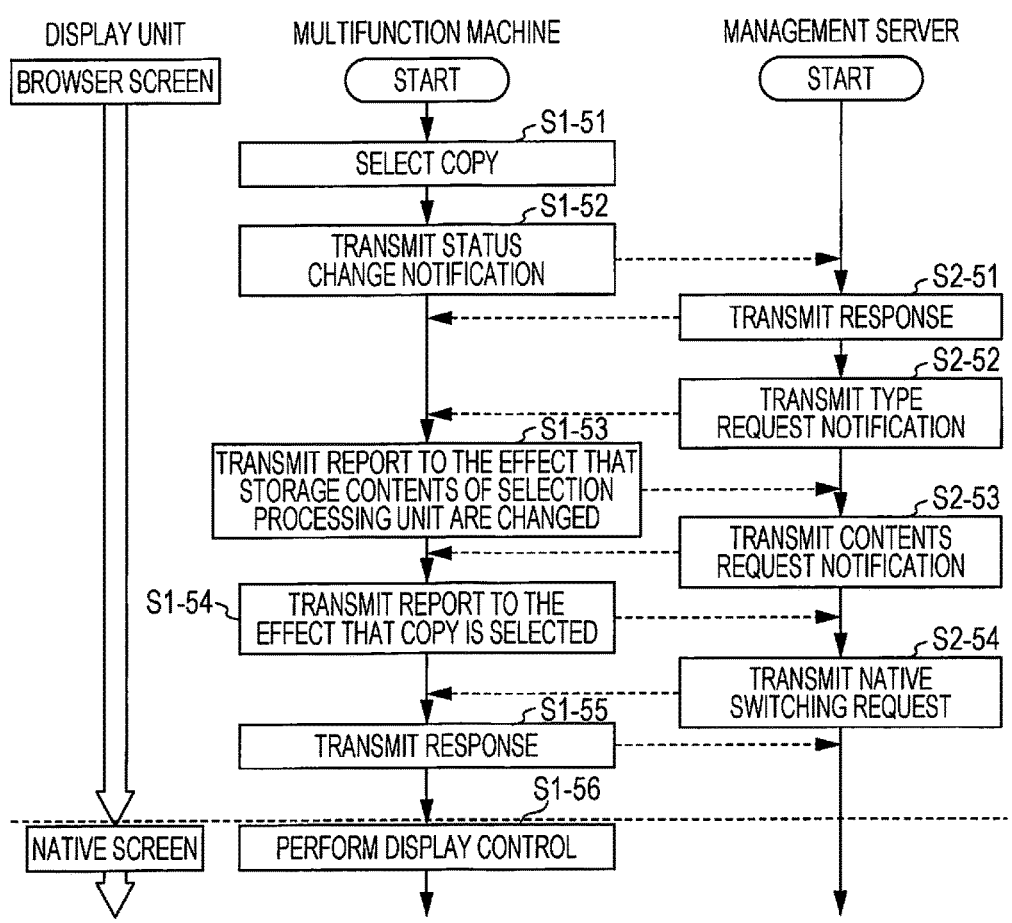
FIG. 14 is a flowchart for describing a procedure for processing that is performed when the copy is selected by operating a hardware key.

Next, referring to a flowchart that is illustrated in FIG. 14, a procedure for processing that is performed by the status management system 10 when the copying is that is one example of the reception-non-required processing is selected by the operation of the hardware key 23B by the user under the situation where the processing selection screen B1 that is one example of the browser screen is displayed on the display unit 232 is described.

As illustrated in FIG. 14, in the multifunction machine 20, when the hardware key 23B of the user interface 23 is operated and copy is selected from among the processing operations that are performable in the multifunction machine 20, the hardware key input processing unit 90 outputs a report to the effect that the copy is selected to the apparatus-side status information management unit 92. When this is done, in the apparatus-side status information management unit 92, the copy is written to the selection processing storage unit 923 (Step S1-51). Then, the notification that the status information that is managed in the multifunction machine 20 is changed is input from the apparatus-side status information management unit 92 to the apparatus-side status change communication unit 96, and the apparatus-side status change communication unit 96 transmits the status change notification to the management server 40 (Step S1-52). In this respect, Step S1-52 is also equivalent to one of the "apparatus-side status change communication step."

When this is done, in the management server 40, the server-side status change communication unit 41 that receives the status change notification transmits the response signal as a response to the status change notification to the multifunction machine 20 (Step S2-51). The response signal is received in the apparatus-side status change communication unit 96. That is, in a case where the status information that is managed by the apparatus-side status information management unit 92 of the multifunction machine 20 is changed, the control device 24 of the multifunction machine 20 functions as a HTTP server, and the management server 40 functions as a HTTP client.

Subsequently, in the management server 40, when the status change notification is received in the server-side status change communication unit 41, the server-side information communication unit 42 transmits the type request notification to the multifunction machine 20 (Step S2-52). In this respect, Step S2-52 is also equivalent to one example of the "server-side request notification transmission step" in which the management server 40 is caused to transmit the request notification (the type request notification in this case) to the multifunction machine 20.

Then, in the multifunction machine 20, when the apparatus-side information communication unit 97 receives the type request notification, the apparatus-side information communication unit 97 makes an inquiry to the apparatus-side status information management unit 92, and acquires a report to the effect that the storage contents of the selection processing storage unit 923 are changed. When this is done, the apparatus-side information communication unit 97 transmits the report to the effect that the storage contents of the selection processing storage unit 923 are changed, as the response to the type request notification, to the management server 40 (Step S1-53). In this respect, Step S1-53 is also equivalent to one example of the "apparatus-side information communication step" in which the control device 24 of the multifunction machine 20 is caused to transmit a response to the request notification (the type request notification in this case) from the management server 40, to the management server 40. That is, after the management server 40 transmits the response to the status change notification from the multifunction machine 20, the control device 24 of the multifunction machine 20 functions as the HTTP client, and the management server 40 functions as the HTTP server.

When this is done, in the management server 40, the server-side information communication unit 42 receives the report to the effect that the storage contents of the selection processing storage unit 923 are changed, as the response to the type request notification, and the server-side information communication unit 42 transmits the contents request notification to the multifunction machine 20 (Step S2-53). In this respect, Step S2-53 is also equivalent to one example of the "server-side request notification transmission step" in which the management server 40 is caused to transmit the request notification (the contents request notification in this case) to the multifunction machine 20.

Then, in the multifunction machine 20, when the apparatus-side information communication unit 97 receives the contents request notification, the apparatus-side information communication unit 97 makes an inquiry to the apparatus-side status information management unit 92, and acquires the storage contents of the selection processing storage unit 923 (the copying in this case). When this is done, the apparatus-side information communication unit 97 transmits the storage contents of the selection processing storage unit 923 (the copying in the case), that is, a report to the effect that the user makes a request to perform the copying, as the response to the contents request notification, to the management server 40 (Step S1-54). In this respect, Step S1-54 is also equivalent to one example of the "apparatus-side information communication step" in which the control device 24 of the multifunction machine 20 is caused to transmit the response to the request notification (the contents request notification in this case) from the management server 40, to the management server 40.

When this is done, in the management server 40, the server-side information communication unit 42 receives the storage contents of the selection processing storage unit 923 (the copying in this case), as the response to the contents request notification. In this case, in the management server 40, the input processing unit 431 knows that the user makes a request to perform the copying. At this time, because the processing selection screen B1 that is one example of the browser screen is displayed on the display unit 232 of the multifunction machine 20, the browser screen provision unit 44 transmits the native switching request to the multifunction machine 20 (Step S2-54). Incidentally, in the case where the native switching request is transmitted, the browser screen provision unit 44 also transmits to the multifunction machine 20 the data relating to the condition parameter for specifying the native screen (the condition selection screen N2 in this case) that is displayed on the display unit 232.

Then, in the multifunction machine 20, the second display control unit 95 receives the native switching request and the data relating to the condition parameter, and the second display control unit 95 transmits the response signal, as the response to the native switching request, to the management server 40 (Step S1-55). Then, the second display control unit 95 outputs a notification that the native switching request is received and data relating to the condition parameter, to the first display control unit 93. Furthermore, the second display control unit 95 that outputs the native switching request terminates the display control for displaying the processing selection screen B1 on the display unit 232, and returns the right to control the display unit 232 to the first display control unit 93.

Then, in the multifunction machine 20, the first display control unit 93 displays the condition selection screen N2 that is one example of the native screen in accordance with the acquired condition parameter, on the display unit 232 by starting the display control (Step S1-56). That is, when Step S1-56 is performed, the screen of the display unit 232 is switched from the processing selection screen B1 (the browser screen) to the condition selection screen N2 (the native screen).

Next, referring to a flow chart that is illustrated in FIG. 15, a procedure for processing that is performed by the status management system 10 until the copying is finished in the multifunction machine 20 and the guidance screen B3 (refer to FIG. 10) that is one example of the browser screen is displayed on the display unit 232 is described.

As illustrated in FIG. 15, in the multifunction machine 20, when the usage information (the number of copies in this case) that results when the control unit 98 finishes performing the coping is output to the apparatus-side status information management unit 92 (Step S1-61). When this is done, the apparatus-side status information management unit 92 writes the usage information that is input, to the usage information storage unit 924 (Step S1-62). Then, the notification that the status information that is managed in the multifunction machine 20 is changed is input from the apparatus-side status information management unit 92 to the apparatus-side status change communication unit 96, and the apparatus-side status change communication unit 96 transmits the status change notification to the management server 40 (Step S1-63). In this respect, Step S1-63 is also equivalent to one of the "apparatus-side status change communication step."

When this is done, in the management server 40, the server-side status change communication unit 41 that receives the status change notification transmits the response signal as a response to the status change notification to the multifunction machine 20 (Step S2-61). The response signal is received in the apparatus-side status change communication unit 96. That is, in the case where the status information that is managed by the apparatus-side status information management unit 92 of the multifunction machine 20 is changed, the control device 24 of the multifunction machine 20 functions as the HTTP server, and the management server 40 functions as the HTTP client.

Subsequently, in the management server 40, when the status change notification is received in the server-side status change communication unit 41, the server-side information communication unit 42 transmits the type request notification to the multifunction machine 20 (Step S2-62). In this respect, Step S2-62 is also equivalent to one example of the "server-side request notification transmission step" in which the management server 40 is caused to transmit the request notification (the type request notification in this case) to the multifunction machine 20.

Then, in the multifunction machine 20, when the apparatus-side information communication unit 97 receives the type request notification, the apparatus-side information communication unit 97 makes an inquiry to the apparatus-side status information management unit 92, and acquires a report to the effect that the storage contents of the usage information storage unit 924 are changed. When this is done, the apparatus-side information communication unit 97 transmits the report to the effect that the storage contents of the usage information storage unit 924 are changed, as the response to the type request notification, to the management server 40 (Step S1-64). In this respect, Step S1-64 is also equivalent to one example of the "apparatus-side information communication step" in which the control device 24 of the multifunction machine 20 is caused to transmit the response to the request notification (the type request notification in this case) from the management server 40, to the management server 40. That is, after the management server 40 transmits the response to the status change notification from the multifunction machine 20, the control device 24 of the multifunction machine 20 functions as the HTTP client, and the management server 40 functions as the HTTP server.

When this is done, in the management server 40, the server-side information communication unit 42 receives the report to the effect that the storage contents of the usage information storage unit 924 are changed, as the response to the type request notification, and the server-side information communication unit 42 transmits the contents request notification to the multifunction machine 20 (Step S2-63). In this respect, Step S2-63 is also equivalent to one example of the "server-side request notification transmission step" in which the management server 40 is caused to transmit the request notification (the contents request notification in this case) to the multifunction machine 20.

Then, in the multifunction machine 20, when the apparatus-side information communication unit 97 receives the contents request notification, the apparatus-side information communication unit 97 makes an inquiry to the apparatus-side status information management unit 92, and acquires the storage contents of the usage information storage unit 924. When this is done, the apparatus-side information communication unit 97 transmits the storage contents of the usage information storage unit 924 are changed, as the response to the contents request notification, to the management server 40 (Step S1-65). In this respect, Step S1-65 is also equivalent to one example of the "apparatus-side information communication step" in which the control device 24 of the multifunction machine 20 is caused to transmit a response to the request notification (the contents request notification in this case) from the management server 40, to the management server 40.

When this is done, in the management server 40, the server-side information communication unit 42 receives the storage contents of the usage information storage unit 924 (the usage information in this case), as the response to the contents request notification. In this case, in the management server 40, the usage information is input into the billing service processing unit 434, and the billing service processing unit 434 performs the billing service processing (Step S2-64). That is, with the billing service processing, management contents in the management table that is illustrated in FIG. 5 are updated. For example, the balance for the group to which the user who causes the multifunction machine 20 to perform the copying is updated. Then, the billing service processing unit 434 outputs data relating to the balance for the group to which the user belongs, to the browser screen provision unit 44. In this case, because the native screen is displayed on the display unit 232 of the multifunction machine 20, the browser screen provision unit 44 transmits the browser switching request to the multifunction machine 20 (Step S2-65). Moreover, in Step S2-65, data relating to a URL of the guidance screen B3 is transmitted along with the browser switching request.

Then, in the multifunction machine 20, the second display control unit 95 receives both of the browser switching request and the data relating to the URL, and the second display control unit 95 transmits the response signal, as the response to the received data, to the management server 40 (Step S1-66). Then, the second display control unit 95 outputs the report to the effect that the browser switching request is received to the first display control unit 93, and makes a request to the management server 40 for the browser screen data relating to the browser screen of the URL that is designated in the management server 40 (Step S1-67).

Moreover, the first display control unit 93 into which the browser switching request is input terminates the display control for displaying the native screen on the display unit 232, and hands over the right to control the display unit 232 to the second display control unit 95.

On the other hand, in the management server 40, when the browser screen data is requested, the browser screen provision unit 44 transmits the browser screen data that is requested, to the multifunction machine 20 (Step S2-66).

Then, in the multifunction machine 20, the second display control unit 95 receives (downloads) the browser screen data, and starts the display control (Step S1-68). Accordingly, the guidance screen B3 relating to the received browser screen data is displayed on the display unit 232. That is, when Step S1-68 is performed, the screen of the display unit 232 is switched from the native screen to the guidance screen B3 (the browser screen).

Moreover, an "OK" area is provided on the guidance screen B3 that is illustrated in FIG. 10. Then, when the "OK" area on the guidance screen B3 is selected by the operation of the touch panel 23A by the user, the touch panel input processing unit 91 outputs the panel operation data to the second display control unit 95. When this is done, the second display control unit 95 transmits the panel operation data that is input, to the management server 40 (Step S1-69).

Then, in the management server 40, when the browser screen provision unit 44 receives the panel operation data, the browser screen provision unit 44 transmits the response signal, as the response to the panel operation data (Step S2-67). Subsequently, because the browser screen is displayed on the display unit 232 of the multifunction machine 20, the browser screen provision unit 44 transmits the native switching request (Step S2-68). Incidentally, in the case where the native switching request is transmitted, the browser screen provision unit 44 also transmits the data relating to the condition parameter for specifying the native screen that is displayed on the display unit 232 to the multifunction machine 20.

Then, in the multifunction machine 20, the second display control unit 95 receives the native switching request and the data relating to the condition parameter, and the second display control unit 95 transmits the response signal, as the response to the native switching request, to the management server 40 (step S1-70). Then, the second display control unit 95 outputs the notification that the native switching request is received and data relating to the condition parameter, to the first display control unit 93. Furthermore, the second display control unit 95 that outputs the native switching request terminates the display control for displaying the processing selection screen B1 on the display unit 232, and returns the right to control the display unit 232 to the first display control unit 93.

Then, in the multifunction machine 20, the first display control unit 93 displays the condition selection screen N2 that is one example of the native screen in accordance with the acquired condition parameter, on the display unit 232 by starting the display control (Step S1-71). That is, when Step S1-71 is performed, the screen of the display unit 232 is switched from the guidance screen B3 (the browser screen) to the condition selection screen N2 (the native screen).

With the configurations and operations that are described above, the following effects can be obtained.

(1) In a status management system 10 according to the present embodiment, in a case where status information that is managed by an apparatus-side status information management unit 92 of a multifunction machine 20 is changed, a control device 24 of the multifunction machine 20 functions as a HTTP server, and a management server 40 functions as a HTTP client. That is, when the status information that is managed by the multifunction machine 20 is changed, a status change notification is transmitted from the multifunction machine 20 to the management server 40. For this reason, with the management server 40 that makes up the system, although in some cases, a server is employed that does not perform polling to determine whether or not the status information that is managed by an apparatus-side status information management unit 92 is changed, the management server 40 can be caused to recognize that the status information that is managed by the apparatus-side status information management unit 92 is changed.

Then, when the management server 40 receives the status change notification, the control device 24 of the multifunction machine 20 functions as the HTTP client, and the management server 40 functions as the HTTP server. That is, the multifunction machine 20 responds to a request notification from the management server 40, and thus the management server 40 can know a type of status information that is changed and contents of the status information that is changed. Therefore, communication can be suitably performed between the multifunction machine 20 and the management server 40, without depending on specifications of the management server 40 that is employed in the status management system.

(2) In the status management system 10 according to the present embodiment, when a touch panel 23A is operated under a situation where a browser screen is displayed on a display unit 232 of the multifunction machine 20, panel operation data that results from the operation is transmitted from the multifunction machine 20 and is received in the management server 40. For this reason, in this case, even if the status change notification is not transmitted from the multifunction machine 20, the management server 40 can know contents that are requested by a user.

(3) On the other hand, key operation data that results from the operation of the hardware key 23B is not transmitted to the management server 40. Furthermore, even if the touch panel 23A is operated under a situation where a native screen is displayed on the display unit 232 of the multifunction machine 20, the panel operation data that results from the operation is not transmitted to the management server 40. For this reason, when this user operation is performed, if the status information that is managed by the apparatus-side status information management unit 92 is changed, a notification of information that is changed is transmitted from the multifunction machine 20 to the management server 40. When this is done, a control device 24 of the multifunction machine 20 functions as the HTTP client, and the management server 40 functions as the HTTP server. As a result, the multifunction machine 20 responds to the request notification from the management server 40, and thus the management server 40 can know the type of the status information that is changed and the contents of the status information that is changed.

(4) Furthermore, in the status management system 10 according to the present embodiment, an account on an authentication card 15 is read by a reading unit 26 of the multifunction machine 20, because storage contents of an account storage unit 921 are changed, the status change notification is transmitted from the multifunction machine 20 to the management server 40. When this is done, the control device 24 of the multifunction machine 20 functions as the HTTP client, and the management server 40 functions as the HTTP server. As a result, the multifunction machine 20 responds to the request notification from the management server 40. Accordingly, the management server 40 can acquire the account that is read by the reading unit 26. As a result, with the account, a user can be permitted to log in to the multifunction machine 20.

(5) furthermore, in the status management system 10 according to the present embodiment, when the multifunction machine 20 performs processing such as copying or printing, usage information associated with the performing of the processing is written to a usage information storage unit 924. When this is done, because the status information that is managed by the multifunction machine 20 is changed, the status change notification is transmitted from the multifunction machine 20 to the management server 40. When this is done, the control device 24 of the multifunction machine 20 functions as the HTTP client, and the management server 40 functions as the HTTP server. As a result, the multifunction machine 20 responds to the request notification from the management server 40, and thus, the management server 40 can acquire the usage information associated with the performing of current processing (such as the copying) by the multifunction machine 20. As a result, the status management system 10 can suitably provide the user with a billing service.

(6) The user operates the multifunction machine 20 under the situation where the browser screen is displayed on the display unit 232 of the multifunction machine 20, and thus there occurs a need to switch a screen that is displayed on the display unit 232 from the browser screen to the native screen. In this case, the management server 40 can know an aspect of the operation of the multifunction machine 20 by the user, that is, contents and the like that are requested by the user. For this reason, the management server 40 makes a request to switch the screen from the browser screen to the native screen, and thus the screen that is displayed on the display unit 232 can be switched from the browser screen to the native screen. Furthermore, the management server 40 can know which of the browser screen and the native screen is displayed on the display unit 232.

(7) When transmitting a native switching request to the multifunction machine 20, the external server transmits data relating to a condition parameter to the multifunction machine 20 as well. For this reason, in the multifunction machine 20, the native screen in accordance with the acquired condition parameter, that is, the native screen that is designated by the management server 40 can be displayed on the display unit 232.

(8) Conversely, the user operates the multifunction machine 20 under the situation where the native screen is displayed on the display unit 232 of the multifunction machine 20, and thus there occurs a need to switch the screen that is displayed on the display unit 232 from the native screen to the browser screen. In this case, the management server 40 can know the aspect of the operation of the multifunction machine 20 by the user, that is, the contents and the like that are requested by the user. For this reason, the management server 40 makes a request to switch the screen from the native screen to the browser screen, and thus the screen that is displayed on the display unit 232 can be switched from the native screen to the browser screen.

Moreover, the embodiment described above may be changed as follows.

Directional keys 82 may be provided in a user interface 23 of the multifunction machine 20. In this case, in a case where a processing selection screen B1 is displayed on the display unit 232, a configuration may be provided in such a manner that even if the hardware keys 23B is operated, processing (such as printing) cannot be selected. Furthermore, in a case where a job list screen B2 is displayed on the display unit 232, even if the hardware keys 23B is operated, the processing (such as the printing) may not be selected. Furthermore, in a case where a condition selection screen N2 is displayed on the display unit 232, even if the hardware key 23B is operated, the processing (such as the printing) may not be selected.

The status information that is managed by the multifunction machine 20 may include a status of a sheet feeding cassette in which pre-print media (sheets of paper) are set. That is, in a case where the sheet feeding cassette is in a state of being mounted into a main body of the multifunction machine 20 and then the sheet feeding cassette is removed from the main body, the status information may be set to be changed, and the status change notification may be transmitted to the management server 40. In this case, the management server 40 and the control device 24 of the multifunction machine 20 perform communication with each other after the management server 40 receives the status change notification, and thus the management server 40 can know that the sheet feeding cassette is removed from the main body of the multifunction machine 20. Therefore, it is possible for the management server 40 to perform suitable reporting to the user by using the display unit 232 of the multifunction machine 20.

The status information that is managed by the multifunction machine 20 may include the number of media that remains in the sheet feeding cassette in which pre-print media (sheets of paper) are set. That is, when the media are used up in the sheet feeding cassette, the status information may be set to be changed, and the status change notification may be transmitted to the management server 40. In this case, the management server 40 and the control device 24 of the multifunction machine 20 perform communication with each other after the management server 40 receives the status change notification, and thus the management server 40 can know that the media are used up in the sheet feeding cassette. Therefore, it is possible for the management server 40 to perform the suitable reporting to the user by using the display unit 232 of the multifunction machine 20.

The status information that is managed by the multifunction machine 20 may include a status of an amount of ink that remains in an ink tank, which is set in the multifunction machine 20. That is, when the amount of remaining ink is less than a predetermine amount of ink, the status information may be set to be changed, and the status change notification may be transmitted to the management server 40. In this case, the management server 40 and the control device 24 of the multifunction machine 20 perform communication with each other after the management server 40 receives the status change notification, and thus the management server 40 can know that the amount of ink that remains in the ink tank becomes small. Therefore, it is possible for the management server 40 to provide a report to the effect that replacement of the ink tank or refilling the ink tank with ink is requested, by using the display unit 232 of the multifunction machine 20.

The status information that is managed by the multifunction machine 20 may include a status of a transportation path for the medium in the multifunction machine 20. That is, when the medium on the transportation path is in a state of being jammed, the status information may be set to be changed, and the status change notification may be transmitted to the management server 40. In this case, the management server 40 and the control device 24 of the multifunction machine 20 perform communication with each other after the management server 40 receives the status change notification, and thus the management server 40 can know that the medium is in a state of being jammed in the multifunction machine 20. Therefore, it is possible for the management server 40 to perform the suitable reporting to the user by using the display unit 232 of the multifunction machine 20.

A usage information processing unit of the management server 40 may be any functional unit that performs processing other than billing service processing as long as the functional unit performs processing in accordance with the acquired usage information. For example, the usage information processing unit may be a functional unit that performs processing which counts the frequency with which every user performs the processing by the multifunction machine 20, based on the acquired usage information, and may be a functional unit that performs processing which estimates the degree of wear of each of the various components that make up the multifunction machine 20.

When transmitting the native switching request to the multifunction machine 20, a browser screen provision unit 44 of the management server 40 may transmit data relating to a condition parameter for specifying the native screen that is displayed on the display unit 232, to the multifunction machine 20. In this case, the multifunction machine 20 itself may determine which native screen needs to be displayed on the display unit 232, based on the aspect of the operation by the user and on the data and the like that are received from the management server 40, and may display the native screen that is determined, on the display unit 232.

An electronic apparatus that makes up the status management system may be an electronic apparatus other than the multifunction machine. For example, the electronic apparatus may be a printer that is capable of performing only the printing, and may be a copy machine that is capable of performing only the copying.

As a control device of the multifunction machine 20, a single core processor may be employed.

The entire disclosure of Japanese Patent Application No. 2014-204934, filed Oct. 3th, 2014 is expressly incorporated by reference herein.

What is claimed is:

1. A status management system comprising:
an electronic apparatus; and
an external server that communicates with the electronic apparatus through a network,
the electronic apparatus including a CPU which serves as
an apparatus-side status change communication unit that transmits a status change notification to the external server when status information that is managed by the electronic apparatus is changed by operating the electronic apparatus, and
an apparatus-side information communication unit that transmits a response to a request notification to the external server when receiving the request notification from the external server, the request notification being a request to transmit the status information,
the external server including
a server-side status change communication unit that receives the status change notification from the electronic apparatus, and
a server-side information communication unit that transmits the request notification to the electronic apparatus when the server-side status change communication unit receives the status change notification, and receives the response to the request notification from the electronic apparatus,
the electronic apparatus further including a display on which a screen is displayed,
the CPU further serving as
a first display control unit that displays on the display a native screen that is a screen which is based on screen data that is prepared in the electronic apparatus without receiving screen data from the external server, and
a second display control unit that displays on the display a browser screen that is a screen which is based on screen data that is received from the external server,
the external server including a switching request unit that requests the electronic apparatus to switch a screen that is displayed on the display of the electronic apparatus from one screen of the native screen and the browser screen to the other screen of the native screen and the browser screen,
the switching request unit requesting the electronic apparatus to switch the screen that is displayed on the display from the native screen to the browser screen, when, under a situation where the native screen is displayed on the display of the electronic apparatus, the server-side information communication unit receives a response to the request notification that is transmitted by the server-side information communication unit and the browser screen is displayed on the display,
the switching request unit requesting the electronic apparatus to switch the screen that is displayed on the display from the browser screen to the native screen, when, under a situation where the browser screen is displayed on the display, the server-side information communication unit receives a response to the request notification that is transmitted by the server-side information communication unit and the native screen is displayed on the display unit,
the electronic apparatus being an apparatus configured to perform a reception-required processing which is processing based on data received from the external server, and a reception-non-required processing which is processing that does not require data received from the external server,
when urging a user to select any processing of the reception-required processing and the reception-non-required processing, the second display control unit of the electronic apparatus receiving screen data relating to the browser screen for processing selection from the external server, and displaying the browser screen for the processing selection based on the screen data on the display,
when, under a situation where the browser screen for the processing selection is displayed on the display of the electronic apparatus, the reception-non-required processing is selected, the switching request unit of the external server transmitting to the electronic apparatus a switching request that is a request for switching the screen displayed on the display from the browser screen to the native screen, and
when receiving the switching request from the external server, the first display control unit of the electronic apparatus displaying on the display the native screen for condition selection to select a condition for performing the reception-non-required processing that is selected.

2. The status management system according to claim 1, wherein the server-side information communication unit of the external server transmits to the electronic apparatus a type request notification that is the request notification that a type of status information that is changed is requested, among pieces of status information that are managed by the electronic apparatus, when the server-side status change communication unit receives the status change notification from electronic apparatus,
the server-side information communication unit of the external server transmits to the electronic apparatus a contents request notification that is the request notification that contents of the status information that is changed are requested, and receives a response to the contents request notification from the electronic apparatus, when the server-side status change communication unit receives data relating to the type of status information that is changed, as a response to the type request notification, from the electronic apparatus,
the apparatus-side information communication unit of the electronic apparatus transmits to the external server the data relating to the type of status information that is changed, as a response to the type request notification, when receiving the type request notification from the external server, and
when receiving the contents request notification from the external server, the apparatus-side information communication unit of the electronic apparatus transmits data relating to the contents of the status information that is changed, as a response to the contents request notification, to the external server.

3. The status management system according to claim 1, wherein, in a case where, among operations that a user causes the electronic apparatus to perform, an operation that changes pieces of status information which are managed by the electronic apparatus is set to be a first user operation and an operation that does not change the pieces of status information that are managed by the electronic apparatus is set to be a second user operation, the apparatus-side status change communication unit of the electronic apparatus transmits the status change notification to the external server when the first user operation is performed, and, on the other hand, does not transmit the status change notification to the external server when the second user operation is performed, and when the first user operation is performed, if the server-side status change communication unit receives the status change notification from the electronic apparatus, the server-side information communication unit of the external server transmits the request notification to the electronic apparatus and receives a response to the request notification, from the electronic apparatus.

4. The status management system according to claim 1, wherein, when requesting the electronic apparatus to switch the screen that is displayed on the display of the electronic apparatus from the browser screen to the native screen, the switching request unit of the external server also transmits data relating to a condition parameter for specifying the native screen that is displayed on the display to the electronic apparatus, and when the external server requests the first display control unit of the electronic apparatus to switch the screen that is displayed on the display from the browser screen to the native screen, the first display control unit of the electronic apparatus displays the native screen in accordance with the condition parameter that is based on data that is received along with the request, on the display.

5. The status management system according to claim 1, wherein the electronic apparatus includes a reader that reads an account which is stored on an authentication card for logging in to the electronic apparatus, the CPU further serves as an account storage unit in which the account that is read by the reader is stored, the external server includes an account authentication processing unit that performs processing which authenticates the account that is read by the reader of the electronic apparatus from the authentication card, and permits logging in to the electronic apparatus, the first user operation includes an operation that causes the authentication card to be read by the reader, the apparatus-side status change communication unit of the electronic apparatus transmits the status change notification to the external server when the account that is read by the reader is stored in the account storage unit, when receiving the request notification from the external server after the status change notification is transmitted from the apparatus-side status change communication unit, the apparatus-side information communication unit of the electronic apparatus transmits a response to the request notification to the external server, when the server-side information communication unit receives data relating to the account, as a response to the request notification, the account authentication processing unit of the external server performs processing that authenticates the account and permits logging in to the electronic apparatus, when the account authentication processing unit permits logging in to the electronic apparatus under a situation where the native screen is displayed on the display of the electronic apparatus, the switching request unit of the external server requests the electronic apparatus to switch the screen that is displayed on the display from the native screen to the browser screen, and when, under a situation where the native screen is displayed on the display, the reader reads the account from the authentication card and the external server makes a request to switch the screen that is displayed on the display from the native screen to the browser screen, the second display control unit of the electronic apparatus receives from external server screen data relating to the browser screen that is displayed on the display and displays the browser screen that is based on the screen data on the display, when logging in to the electronic apparatus is permitted.

6. The status management system according to claim 1, wherein the electronic apparatus includes a usage information storage unit in which usage information that is information relating to processing is stored when the electronic apparatus performs the processing, the external server includes a usage information processing unit that performs processing in accordance with the usage information that is stored in the usage information storage unit of the electronic apparatus, the apparatus-side status change communication unit of the electronic apparatus transmits the status change notification to the external server when the usage information is stored in the usage information storage unit, and the usage information processing unit of the external server performs processing in accordance with the usage information, when the server-side information communication unit receives data relating to the usage information that is stored in the usage information storage unit, as a response to the request notification.

7. The status management system according to claim 6, wherein the electronic apparatus includes a touch panel, the second user operation includes an operation of the touch panel, panel operation data that is data relating to the operation of the touch panel is transmitted to the external server, the apparatus-side status change communication unit of the electronic apparatus does not transmit the status change notification to the external server, when the reception-non-required processing is selected by the operation of the touch panel, under a situation where the browser screen for the processing selection is displayed on the display, and the switching request unit of the external server transmits to the electronic apparatus the switching request that is the request for switching the screen that is displayed on the display from the browser screen to the native screen, when receiving the panel operation data to the effect that the reception-non-required processing is selected, in the situation where the browser screen for the processing selection is displayed on the display of the electronic apparatus.

8. The status management system according to claim 6, wherein the electronic apparatus has push-down type hardware keys, the first user operation includes an operation of the hardware key, processing operations are selectable by the operation of the hardware key when the browser screen for the processing selection is displayed on the display of the electronic apparatus, the apparatus-side status change communication unit of the electronic apparatus transmits the status change notification to the external server when the reception-non-required processing is selected by the operation of the hardware key under a situation where the browser screen for the processing selection is displayed on the display of the electronic apparatus, under the situation where the browser screen for the processing selection is displayed on the display of the electronic apparatus, the apparatus-side status change communication unit transmits the status change notification because the reception-non-required processing is selected by the operation of the hardware key, and when receiving the request notification from the external server, the apparatus-side information communication unit of the electronic apparatus transmits a report to the effect that the reception-non-required processing is selected, as a response to the request notification, to the external server, and when the server-side information communication unit receives the report to the effect that the reception-non-required processing is selected, as the response to the request notification under the situation where the browser screen for the processing selection is displayed on the display of the electronic apparatus, the switching request unit of the external server transmits to the electronic apparatus the switching request that is the request for switching the screen that is displayed on the display from the browser screen to the native screen.

9. An electronic apparatus that communicates with an external server through a network, comprising:
a CPU which serves as
an apparatus-side status change communication unit that transmits a status change notification to the external server when status information that is managed by the electronic apparatus is changed by operating the electronic apparatus, and
an apparatus-side information communication unit that, when receiving a request notification from the external server which receives the status change notification, transmits a response to the request notification, to the external server, the request notification being a request to transmit the status information; and
a display on which a screen is displayed,
the CPU further serving as
a first display control unit that displays on the display a native screen that is a screen which is based on screen data that is prepared in the electronic apparatus without receiving screen data from the external server, and
a second display control unit that displays on the display a browser screen that is a screen which is based on screen data that is received from the external server,
the external server including a switching request unit that requests the electronic apparatus to switch a screen that is displayed on the display of the electronic apparatus from one screen of the native screen and the browser screen to the other screen of the native screen and the browser screen,
the switching request unit requesting the electronic apparatus to switch the screen that is displayed on the display from the native screen to the browser screen, when, under a situation where the native screen is displayed on the display of the electronic apparatus, the server-side information communication unit receives a response to the request notification that is transmitted by the server-side information communication unit and the browser screen is displayed on the display, the switching request unit requesting the electronic apparatus to switch the screen that is displayed on the display from the browser screen to the native screen, when, under a situation where the browser screen is displayed on the display, the server-side information communication unit receives a response to the request notification that is transmitted by the server-side information communication unit and the native screen is displayed on the display unit, the electronic apparatus being an apparatus configured to perform a reception-required processing which is processing based on data received from the external server, and a reception-non-required processing which is processing that does not require data received from the external server, when urging a user to select any processing of the reception-required processing and the reception-non-required processing, the second display control unit of the electronic apparatus receiving screen data relating to the browser screen for processing selection from the external server, and displaying the browser screen for the processing selection based on the screen data on the display, when, under a situation where the browser screen for the processing selection is displayed on the display of the electronic apparatus, the reception-non-required processing is selected, the switching request unit of the external server transmitting to the electronic apparatus a switching request that is a request for switching the screen displayed on the display from the browser screen to the native screen, and when receiving the switching request from the external server, the first display control unit of the electronic apparatus displaying on the display the native screen for condition selection to select a condition for performing the reception-non-required processing that is selected.

10. A method of communication in a system, which is applied to a status management system including an electronic apparatus and an external server that communicates with the electronic apparatus through a network, comprising:
causing a control device of the electronic apparatus to transmit a status change notification to the external server when status information that is managed by the electronic apparatus is changed by operating the electronic apparatus;
causing the external server to transmit a request notification to the electronic apparatus when the status change notification is received from the electronic apparatus, the request notification being a request to transmit the status information; and
causing the control device of the electronic apparatus to transmit to the external server a response to the request notification when the request notification is received from the external server,
the electronic apparatus including a display on which a screen is displayed,
the method further including
displaying on the display a native screen that is a screen which is based on screen data that is prepared in the electronic apparatus without receiving screen data from the external server by a first display control unit of the electronic apparatus, and displaying on the display a browser screen that is a screen which is based on screen data that is received from the external server by a second display control unit of the electronic apparatus, the external server including a switching request unit that requests the electronic apparatus to switch a screen that is displayed on the display of the electronic apparatus from one screen of the native screen and the browser screen to the other screen of the native screen and the browser screen, the switching request unit requesting the electronic apparatus to switch the screen that is displayed on the display from the native screen to the browser screen, when, under a situation where the native screen is displayed on the display of the electronic apparatus, the server-side information communication unit receives a response to the request notification that is transmitted by the server-side information communication unit and the browser screen is displayed on the display, the switching request unit requesting the electronic apparatus to switch the screen that is displayed on the display from the browser screen to the native screen, when, under a situation where the browser screen is displayed on the display, the server-side information communication unit receives a response to the request notification that is transmitted by the server-side information communication unit and the native screen is displayed on the display unit, the electronic apparatus being an apparatus configured to perform a reception- required processing which is processing based on data received from the external server, and a reception-non-required processing which is processing that does not require data received from the external server, when urging a user to select any processing of the reception-required processing and the reception-non-required processing, the second display control unit of the electronic apparatus receiving screen data relating to the browser screen for processing selection from the external server, and displaying the browser screen for the processing selection based on the screen data on the display, when, under a situation where the browser screen for the processing selection is displayed on the display of the electronic apparatus, the reception-non-required processing is selected, the switching request unit of the external server transmitting to the electronic apparatus a switching request that is a request for switching the screen displayed on the display from the browser screen to the native screen, and when receiving the switching request from the external server, the first display control unit of the electronic apparatus displaying on the display the native screen for condition selection to select a condition for performing the reception-non-required processing that is selected.

11. A status management system comprising:

an electronic apparatus; and an external server that communicates with the electronic apparatus through a network, the electronic apparatus including a CPU which serves as
an apparatus-side status change communication unit that transmits a status change notification to the external server when status information that is managed by the electronic apparatus is changed by operating the electronic apparatus, and an apparatus-side information communication unit that transmits a response to a request notification to the external server when receiving the request notification from the external server, the request notification being a request to transmit the status information, and the external server including
a server-side status change communication unit that receives the status change notification from the electronic apparatus, and a server-side information communication unit that transmits the request notification to the electronic apparatus when the server-side status change communication unit receives the status change notification, and receives the response to the request notification from the electronic apparatus, among operations that a user causes the electronic apparatus to perform, an operation that changes pieces of status information which are managed by the electronic apparatus being set to be a first user operation and an operation that does not change the pieces of status information that are managed by the electronic apparatus being set to be a second user operation, the first user operation including a logging-out operation that is an operation for logging out of the electronic apparatus, the external server including a logging-out permission unit that performs logging out of the electronic apparatus when the logging-out operations is performed, the apparatus-side status change communication unit of the electronic apparatus transmitting the status change notification to the external server when the logging-out operation is performed, the apparatus-side information communication unit of the electronic apparatus transmitting a response to the request notification to the external server when receiving the request notification from the external server by the apparatus-side status change communication transmitting the status change notification because of the logging-out operation that is performed, and the logging-out permission unit of the external server permitting logging out of the electronic apparatus when the server-side information communication unit receives from the electronic apparatus a report to the effect that the logging-out operation is performed as the response to the request notification.

* * * * *